United States Patent
Li et al.

(10) Patent No.: US 11,801,613 B2
(45) Date of Patent: Oct. 31, 2023

(54) CARBIDE BLADE CLEANING DEVICE AND SYSTEM

(71) Applicants: QINGDAO UNIVERSITY OF TECHNOLOGY, Shandong (CN); NINGBO SANHAN ALLOY MATERIAL CO., LTD, Zhejiang (CN)

(72) Inventors: Changhe Li, Qingdao (CN); Shuo Yin, Qingdao (CN); Liang Luo, Qingdao (CN); Weixi Ji, Qingdao (CN); Binhui Wan, Qingdao (CN); Xuefeng Xu, Qingdao (CN); Haogang Li, Qingdao (CN); Huajun Cao, Qingdao (CN); Bingheng Lu, Qingdao (CN); Lizhi Tang, Qingdao (CN); Xin Cui, Qingdao (CN); Mingzheng Liu, Qingdao (CN); Yanbin Zhang, Qingdao (CN); Jie Xu, Qingdao (CN); Huiming Luo, Qingdao (CN); Haizhou Xu, Qingdao (CN); Min Yang, Qingdao (CN); Huaping Hong, Qingdao (CN); Teng Gao, Qingdao (CN); Yuying Yang, Qingdao (CN); Wuxing Ma, Qingdao (CN); Shuai Chen, Qingdao (CN)

(73) Assignees: QINGDAO UNIVERSITY OF TECHNOLOGY, Qingdao (CN); NINGBO SANHAN ALLOY MATERIAL CO., LTD., Ningbo (CN)

( * ) Notice: Subject to any disclaimer, the term of this patent is extended or adjusted under 35 U.S.C. 154(b) by 276 days.

(21) Appl. No.: 17/340,579

(22) Filed: Jun. 7, 2021

(65) Prior Publication Data
US 2022/0055243 A1    Feb. 24, 2022

(30) Foreign Application Priority Data
Aug. 19, 2020 (CN) .......................... 202010837401.8

(51) Int. Cl.
*B26D 7/08* (2006.01)
*B08B 3/02* (2006.01)
(Continued)

(52) U.S. Cl.
CPC ................ *B26D 7/088* (2013.01); *B08B 3/02* (2013.01); *B08B 7/028* (2013.01); *B08B 7/04* (2013.01)

(58) Field of Classification Search
None
See application file for complete search history.

(56) References Cited

PUBLICATIONS

CN 108856091 A translation, Full-automatic Pass-type PCB Milling Cutter Ultrasonic Cleaning Machine And Cleaning Method, 2018 (Year: 2018).*

(Continued)

*Primary Examiner* — Cristi J Tate-Sims
(74) *Attorney, Agent, or Firm* — Oliff PLC

(57) ABSTRACT

A carbide blade cleaning device includes a water pressure cleaning device, an ultrasonic cleaning device and an air drying device. The water pressure cleaning device includes a cleaning chamber for accommodating a cutter head and a water jet mechanism with an output end facing the cutter head. The ultrasonic cleaning device includes a cleaning box and a cutter head fixing box with an opening in a side surface for accommodating the cutter head, and a first telescopic mechanism drives the cutter head fixing box to adjust a relative position to the cleaning box. The air drying device includes a cutter head fixing table and an air drying mechanism with an output end facing the cutter head fixing table.

6 Claims, 16 Drawing Sheets

(51) Int. Cl.
  *B08B 7/02*   (2006.01)
  *B08B 7/04*   (2006.01)

(56)       References Cited

PUBLICATIONS

CN 209139303 U translation, A Full-automatic Ultrasonic Cleaning Machine Tool (Year: 2019).*

* cited by examiner

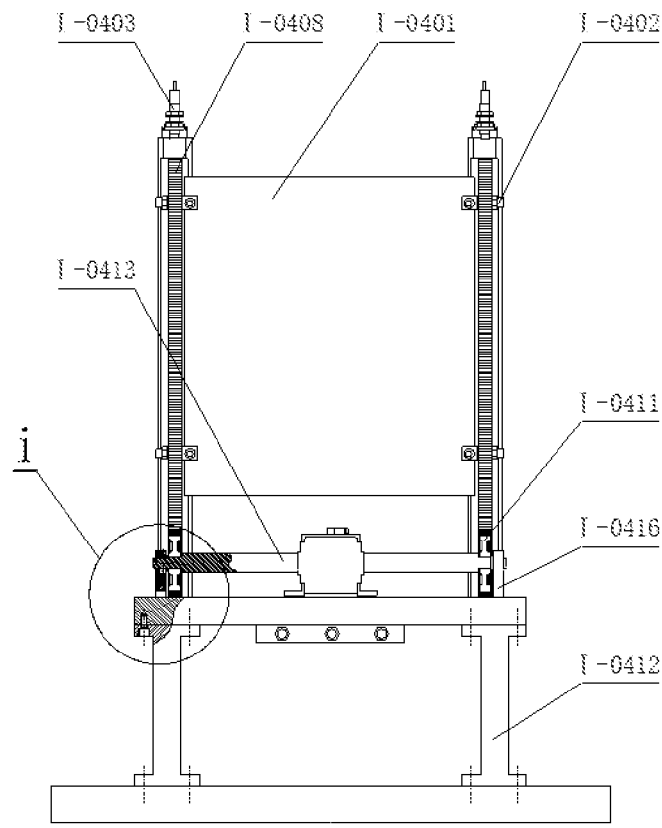
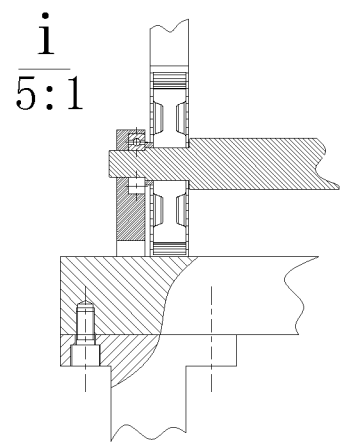
FIG. 8(a)　　　　FIG. 8(b)
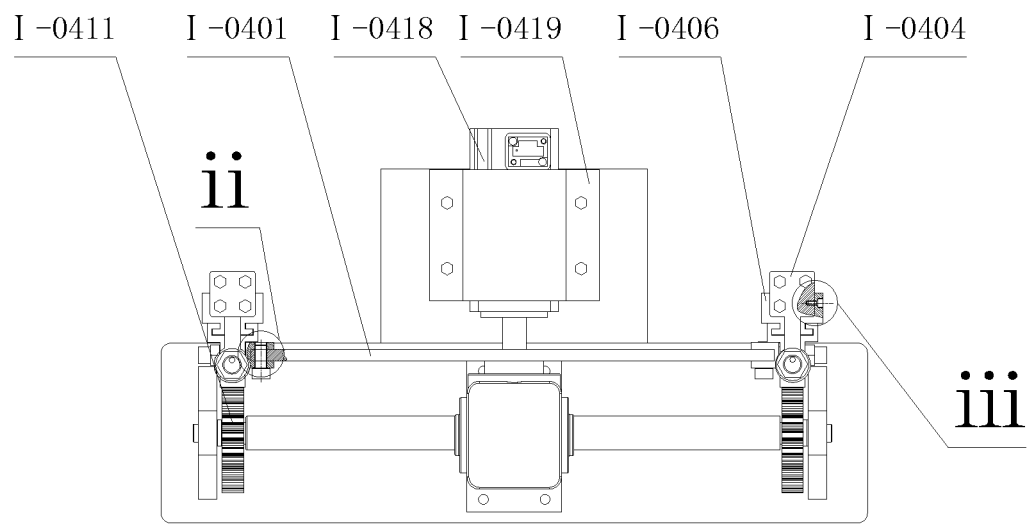
FIG. 9(a)

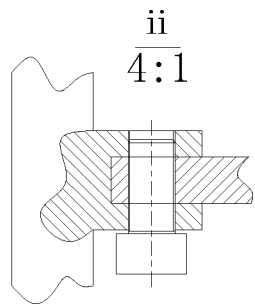
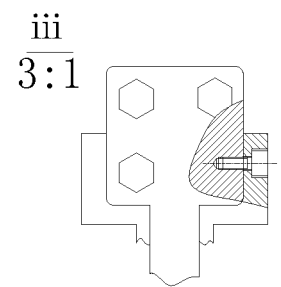
FIG. 9(b)
FIG. 9(c)
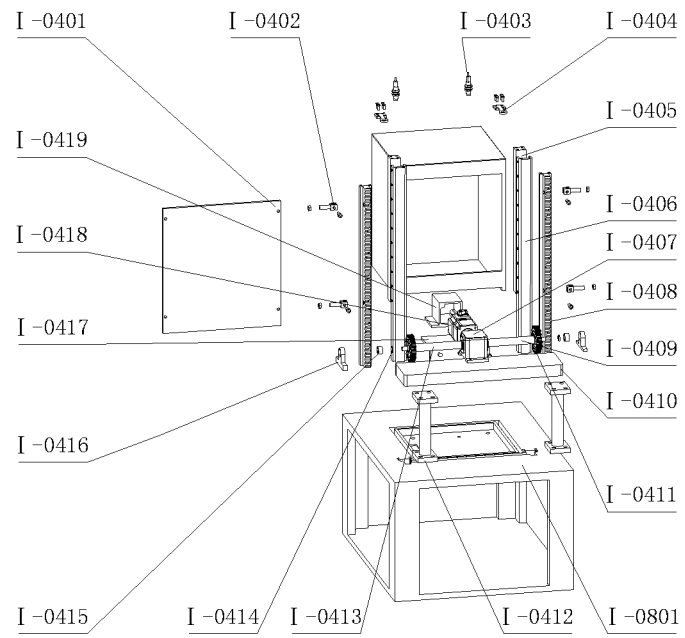
FIG. 10
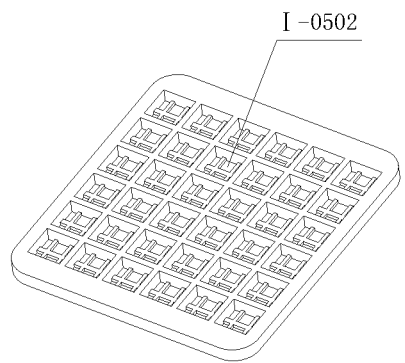
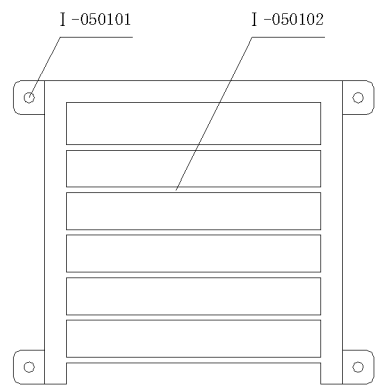
FIG. 11(a)
FIG. 11(b)

CARBIDE BLADE CLEANING DEVICE AND SYSTEM

BACKGROUND

Technical Field

The present disclosure relates to the field of blade processing, and particularly relates to a carbide blade cleaning device and system.

Related Art

The description in this section merely provides background information related to the present disclosure, and does not necessarily constitute the prior art.

As a pillar industry of national economy, the development level of the manufacturing industry is an important factor for determining the comprehensive national strength of a country. Machine tool processing is an important implementation form of manufacturing industry production. There are a great variety of types, involving different types of machine tools, such as lathes, milling machines and grinding machines. With the progress of science and technology, the precision requirement of various industry fields on manufacturing industry machining parts is higher and higher, and the quality of a machine tool cutter plays a decisive role in the part processing precision. In order to meet the processing accuracy, a machine tool cutter should have high hardness, high wear resistance, sufficient strength and toughness, and high heat resistance. A carbide blade is made of cemented carbide. The cemented carbide is an alloy material made of hard compounds of refractory metals and bonding metals through a powder metallurgy process, and can meet the attribute requirements of a cutter in the machining process. The manufacturing process of the carbide blade mainly includes technical processes such as powder production, powder pressing, high-temperature sintering, blade grinding, blade passivation and coating. The grinding machining work procedure of the carbide blade mainly adopts a diamond grinding wheel grinding machining method, and the final production process of the carbide blade is completed through grinding processes such as blade end surface grinding, polishing, periphery grinding, blade grooving, and cutting edge grinding, followed by subsequent passivation and coating.

In the above processing process, the grinding process of the blade directly determines the cutting performance of a finished blade product. In the blade grinding process, the periphery grinding process of the carbide blade directly processes a cutting region cutting edge and its periphery portion of the blade. At the present stage, most blade production factories in China use periphery edge grinding machine tools to machine indexable carbide blades. The processing process has no need of manual participation, different processing programs of a grinding machine are called according to the types of blades to be processed for blade periphery grinding. The grinding machine is provided with a special loading manipulator which grabs one blade each time and places the blade in a grinding region for grinding and machining. The blade uses a cutter head as a loading carrier, and rectangular cutter grooves uniformly distributed are usually formed in the cutter head. In order to improve the utilization rate of the cutter head, a blade end surface flat arrangement mode is generally used. In the grinding machining process, a mechanical gripper takes out an unprocessed blade from the cutter head and load the blade to the grinding region, and then put the ground blade into an original cutter groove position of the cutter head again.

The inventor found that a conventional blade periphery grinding machining mode can realize uninterrupted processing all day long. However, in the processing process, for a plurality of machine tools, there must be a special person a special person to carry out the cutter head loading and unloading of the blade periphery grinding machine, and a worker regularly inspects the blade processing progress in each grinding machine cutter head, replaces a tray for the cutter head completing the blade periphery grinding, and simultaneously conveys the processed carbide blade to a next production process link. Due to different processing rhythm asynchronism of different lathes, the cutter head loading and unloading may be needed at any different time stages without regularity, and an inspector needs to continuously work to relatively guarantee the production efficiency of a whole line, and to keep the grinding machine always in a processing state. At the same time, the unloaded blade has completed molding and processing, and needs subsequent work procedures such as cleaning and blade detection. Different factories use different blade processing apparatuses. A small number of grinding machines with high intelligent degrees have a blade cleaning function. That is, after the blade is ground, before a manipulator puts the blade back to the cutter head, the blade is conveyed to a cleaning position for water jet flushing and is then put into the cutter head. However, most grinding machines are lack of cleaning modules, and generally, the blades are unloaded and then cleaned collectively. In the blade cleaning process, the blades are taken out from the cutter head, and poured into a cleaning apparatus in batches and cleaned. After cleaning, before a subsequent processing process, a professional person is required to refill the blades into the cutter head again, so that the cleaning work efficiency is low. The existing cutter head loading and unloading mode cannot meet the requirement for blade production efficiency improvement.

SUMMARY

The objective of the present disclosure is to provide a carbide blade cleaning device and system aiming at the defects in the prior art. Periphery grinding machine cutter head automatic loading and unloading and blade cleaning and air drying functions are realized, the labor intensity in the blade periphery grinding cutter head loading and unloading processes is reduced, the loading and unloading timeliness of each machine tool is guaranteed, and the processing efficiency of the blade periphery grinding is improved.

A first objective of the present disclosure is to provide a carbide blade cleaning device using the following technical solution:

The carbide blade cleaning device includes a water pressure cleaning device, an ultrasonic cleaning device and an air drying device. The water pressure cleaning device includes a cleaning chamber for accommodating a cutter head and a water jet mechanism with an output end facing the cutter head. The ultrasonic cleaning device includes a cleaning box and a cutter head fixing box provided with an opening in a side surface for accommodating the cutter head, and a first telescopic mechanism drives the cutter head fixing box to adjust a relative position to the cleaning box. The air drying device includes a cutter head fixing table and an air drying mechanism with an output end facing the cutter head fixing table.

Further, the water jet mechanism communicates with a water circulation mechanism through a pipeline, an input end of the water circulation mechanism communicates with a cleaning water collecting box positioned at the bottom of the cleaning chamber, and an output end communicates with a plurality of spray nozzles of the water jet mechanism through an electromagnetic valve.

Further, a baffle cooperates with a side surface of the cleaning chamber, and the baffle cooperates with the water jet mechanism at the top of the cleaning chamber and the cleaning water collecting box at the bottom of the cleaning chamber to form a cleaning space. One baffle cooperates with a lifting mechanism, and the lifting mechanism drives the baffle to ascend or descend, so as to close or open the cleaning space.

Further, the cutter head fixing box is disposed on the cleaning box through an ultrasonic cleaning support frame, the cutter head fixing box is connected to the ultrasonic cleaning support frame through a telescopic air cylinder, and the cutter head fixing box is driven under the action of the telescopic air cylinder to enter or retreat from a work groove of the cleaning box.

Further, an opening is formed in each of a pair of side surfaces of the cutter head fixing box, side surfaces adjacent to the side surfaces with the openings are connected to the telescopic air cylinder, and a plurality of cleaning holes communicating with the inside of the cutter head fixing box are formed in each of a top plate and a bottom plate of the cutter head fixing box.

A second objective of the present disclosure is to provide a carbide blade cleaning system using the following technical solution:

The carbide blade cleaning system includes a transfer station for storing a cutter head, a conveyor cooperating with the transfer station, a loading and unloading robot cooperating with the transfer station and the carbide blade cleaning device as described above.

Further, the conveyor includes a support seat, a storage box disposed on the support seat and a grabber disposed on the storage box. The grabber is disposed on the storage box through a position adjusting mechanism, and the position adjusting mechanism drives the grabber to adjust a relative position to the storage box for grabbing the cutter head and putting into the storage box or taking out the cutter head from the storage box.

Further, the conveyor cooperates with a conveying mechanism through the support seat, and the conveyor is driven to adjust a position; and a plurality of transfer stations cooperate on a conveyor moving path, and a plurality of storage lattices are disposed in each of the transfer stations, and are configured to store the cutter heads.

Compared with the prior art, the present disclosure has the following advantages and positive effects:

(1) Periphery grinding machine cutter head automatic loading and unloading and blade cleaning and air drying functions are achieved. The labor intensity in blade periphery grinding cutter head loading and unloading processes is reduced, the loading and unloading timeliness of each machine tool is guaranteed, and the processing efficiency of the blade periphery grinding is improved.

(2) The automatic loading and unloading of the blade periphery grinding machining processes is achieved, the labor intensity in the processing process is reduced, the automation degree of the integral blade periphery grinding processing process is further improved, and an unmanned processing mode is further realized.

(3) A cutter head temporary storage and intelligent transportation function is achieved, and the material supply of each link in the production process can be ensured. Additionally, the previous and later processing links of the blade are closely connected, so that the smoothness of the processing process of the whole production line is improved.

(4) A blade cleaning and air drying function is added, and a blade grinding machine function is expanded. Additionally, in the cleaning and air drying processes, the loading and unloading cutter head in the blade periphery grinding process is used as a carrier, and blade taking and secondary filling are not needed. Therefore, the continuity of the whole work flow process is good, the flow process is compact, the production efficiency is high, the processing flow process of the blade is reasonably optimized, the number of filling times in the whole processing process of the blade is reduced, the labor intensity is further reduced, and the production cost of the blade is reduced.

(5) A cutter head loading and unloading conveyor in the system can realize the grinding machine cutter head loading and unloading, and also has a cutter head conveying function. The cutter head transfer stations are disposed at the front end and the back end of the grinding production line, and the conveyor works according to the primary and secondary requirements of the cutter head conveying, the loading and loading and conveying processes of the cutter head conveyor are coordinated, and the work stability of the system is improved.

(6) The blade in the system uses a high-pressure water jet and ultrasonic mixed cleaning mode, and a high-pressure water jet device regulates and controls water flow parameters through a proportional flow rate valve and a proportional pressure adjusting valve, which enhances the blade cleaning effect.

(7) The blade water pressure cleaning device in the system uses a water circulation water supply mode. By adding a filtering apparatus to remove the impurities from cleaning recirculation water, and filtered water flows back into a water supply box, so that the cleaning water utilization rate is improved, water resources are saved, and filtered impurities can be conveniently collected and treated, meeting the green manufacturing requirements.

(8) The cleaned blade in the system is air-dried with high-temperature and dry compressed air. An air outlet of a blade air drier is in short-distance contact with a cutter head cutter groove, the air directly enters the rectangular cutter groove and flows out from through a hole at the bottom of the cutter head, and the air circulation distance is shortened. At the same time, through the compressed air, the temperature of the blade is raised, the moisture on the surface of the blade is rapidly evaporated, and the speed of moisture removal from the leeward surface of the blade is accelerated. At the same time, heat insulation cotton is mounted at an outer end of a compressed air conveying pipe for heat insulation of the compressed air, and thus the utilization rate on the compressed air is improved.

(9) Intelligent control modules are disposed in the system, different modules are communicated with each other using matched communication protocols, and all sub units are coordinated and commanded to complete the work under a general control system. At the same time, the system can be directly connected into a digital production workshop system, meeting the modern intelligent manufacturing requirements.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

FIG. 8(a) is a front view of a cleaning chamber of the blade water pressure cleaning device in Embodiment 1 and Embodiment 2 of the present disclosure.

FIG. 8(b) is a local enlarged view of a position i in FIG. 8(a).

FIG. 9(a) is a top view of a cleaning chamber of the blade water pressure cleaning device in Embodiment 1 and Embodiment 2 of the present disclosure.

FIG. 9(b) is a local enlarged view of a position ii in FIG. 9(a). FIG. 9(c) is a local enlarged view of a position iii in FIG. 9(a).

FIG. 10 is an exploded view of an assembly component of the cleaning chamber of the blade water pressure cleaning device in Embodiment 1 and Embodiment 2 of the present disclosure.

FIG. 11(a) is an axonometric diagram of a supply tray of a blade periphery grinding system in Embodiment 1 and Embodiment 2 of the present disclosure.

FIG. 11(b) is a top view of a blade high-pressure water jet cleaning cutter head fixing box in Embodiment 1 and Embodiment 2 of the present disclosure.

Figure 1:
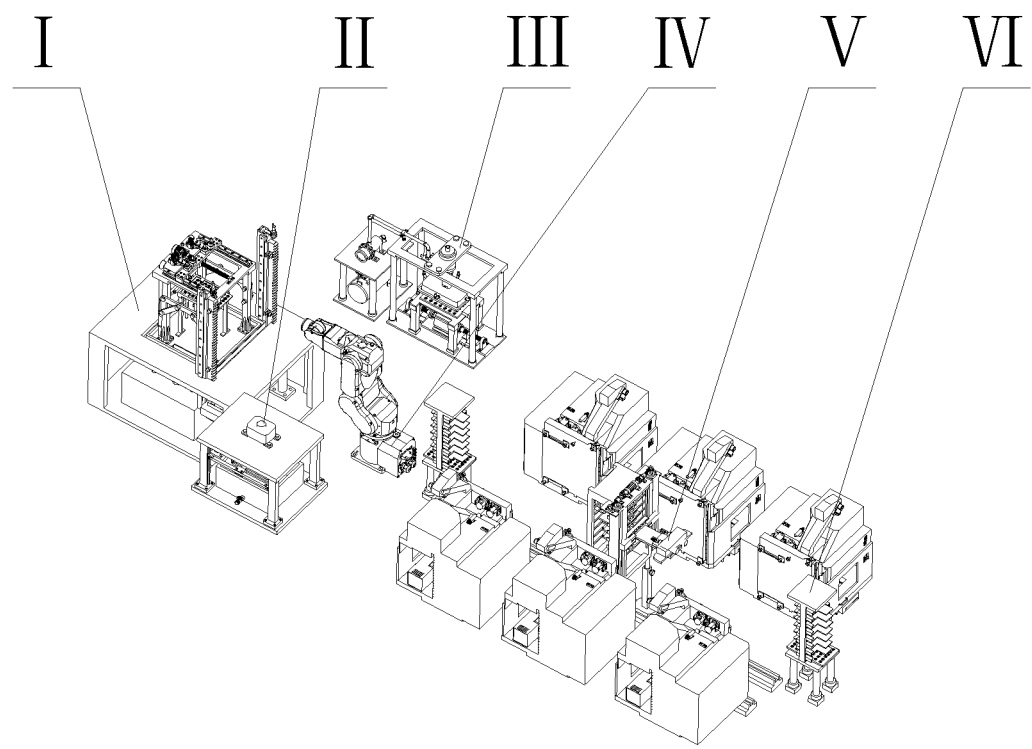
FIG. 1 is an axonometric diagram of a carbide blade periphery grinding machine loading and unloading system device in Embodiment 1 and Embodiment 2 of the present disclosure.

In the drawings, I blade water pressure cleaning device, II blade ultrasonic cleaning device, III blade air drying device, IV cutter head loading and unloading robot, V periphery grinding machine cutter head loading and unloading conveyor, and VI periphery grinding machine cutter head transfer station.

I-01 water supply box unit, I-02 water jet device fixing frame, I-03 water jet device, I-04 cleaning chamber unit, I-05 cutter head fixing seat, I-06 motor controller, I-07 water pressurizing unit, and I-08 cleaning device installing base.

I-0101 water level display pipe, I-0102 water supply box top cover, I-0103 recirculation filter, I-0104 cleaning water collecting box, I-0105 water supply box shell, I-0106 water supply box water change valve, I-0201 device fixing frame top plate, I-0301 spray nozzle lead screw driving motor, I-0302 spray nozzle lead screw end portion support seat, I-0303 water jet spray nozzle, I-0304 water jet electromagnetic control switch, I-0305 spray nozzle cushion block, I-0306 spray nozzle fixing plate, I-0307 water jet spray nozzle feeding guide rail, I-0308 water jet spray nozzle feeding sliding block, I-0309 water supply pipe, I-0110 bearing, I-0111 lead screw nut block, I-0112 spray nozzle driving lead screw, I-0113 coupling, I-0401 cleaning chamber front baffle, I-0402 front baffle fixing pin, I-0403 position limiting switch, I-0404 position limiting switch fixing clamp, I-0405 guide rail fixing post, I-0406 rack sliding guide rail, I-0407 rotating shaft direction changer, I-0408 front baffle fixing rack, I-0409 direction changer right rotating shaft, I-0410 direction changer fixing plate, I-0411 gear, I-0412 direction changer fixing plate base, I-0413 direction changer left rotating shaft, I-0414 bearing fixing sleeve, I-0415 direction changer rotating shaft bearing, I-0416 bearing block, I-0417 front baffle driving motor fixing plate, I-0418 front baffle driving motor, I-0419 front baffle driving motor fixing casing, I-0501 cutter head fixing box, I-0502 cleaning cutter head, I-0701 water pumping pipe bottom filter, I-0702 pressure water pump, I-0703 pressure water pump water outlet pipe, I-0801 base top plate, I-0802 water outlet pipe through hole, I-0803 cleaning water collecting hole, I-0804 electric wire pipe through hole, I-0805 front baffle moving sliding rail through hole, I-0806 base bottom plate; and I-050101 cutter head fixing box connecting hole, and I-050102 cutter head cleaning baffle strip.

II-01 ultrasonic cleaning device support frame, II-02 air cylinder fixing top plate, II-03 telescopic air cylinder, II-04 rolling wheel side rod fixing frame connecting block, II-05 rolling wheel side rod fixing frame, II-06 rolling wheel side rod, II-07 ultrasonic cleaning control plate, II-08 ultrasonic cleaning device bottom plate, II-09 ultrasonic cleaning box; II-10 hollow connecting plate, II-11 cutter head fixing box fixing plate, and II-12 cutter head fixing box.

II-1201 cutter head fixing box side wall connecting hole, II-1202 cutter head fixing box cleaning hole, and II-1203 cutter head feeding opening.

III-01 air compressor, III-02 compressed air heater, III-03 compressed air diverter, III-04 telescopic air cylinder, III-05 blade air drier, and III-06 cutter head fixing table.

III-0501 blade air drying air inlet pipe, III-0502 blade air drying ventilation chamber, III-0503 blade air drier connecting hole, III-0601 cutter head air drying fixing table, III-0602 blade to-be-dried accommodating cutter head, III-0603 cutter head loading Y axis positioning plate, III-0604 pressure sensor, III-0605 cutter head loading X axis positioning block, III-0606 positioning block lead screw nut, III-0607 positioning device bearing block, III-0608 positioning block driving lead screw, III-0609 fixing table support side rod, III-0610 double-shaft motor, III-0611 cutter head positioning table base, III-0612 positioning lead screw coupling, III-0613 X axis sliding rail, III-0614 positioning block driving lead screw bearing, III-0615 X axis positioning sliding block, III-0616 blade air drying water collecting box, III-060301 cutter head baffle, III-060302 baffle compressed spring, and III-060303 baffle fixing seat.

V-01 lifting driving worm wheel, V-02 closed cavity top plate, V-03 lifting lead screw thrust bearing, V-04 worm rod inner end support seat, V-05 worm rod coupling, V-06 lifting driving double-shaft motor, V-07 cutter head gripper fixing sliding block, V-08 cutter head grabber, V-09 closed cavity bottom plate, V-10 lifting lead screw, V-11 lead screw nut fixing block, V-12 worm rod outer end support seat, V-13 lifting driving worm rod; and V-14 lead screw installing cavity front cover plate, and V-15 conveyor support seat.

V-0801 cutter head grabber connecting hole, V-0802 cutter head gripper rotating machine, and V-0803 cutter head telescopic gripper.

DETAILED DESCRIPTION

It should be noted that the following detailed descriptions are exemplary and are intended to provide further explanation of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

For convenient description, the words of "upper", "lower", "left" and "right" in the present disclosure, if any, refer to directions corresponding to the up, down, left and right directions of the drawings themselves, and do not limit the structure, but merely facilitate the descriptions of the present invention and simplify the descriptions, rather than indicate or imply that the referenced device or element must have a particular orientation, be constructed and operated in a particular orientation, and thus should not be construed as limiting the present disclosure.

As being introduced in the related art, in the blade cleaning process in the prior art, blades are taken out from a cutter head, and poured into a cleaning apparatus in batches and cleaned. After cleaning, before a subsequent processing process, a professional person is needed to refill the blades into the cutter head again. The existing cutter head loading and unloading mode cannot meet the requirement of blade production efficiency improvement.

By aiming at the above problem, the present disclosure provides a carbide blade cleaning device and system.

Embodiment 1

Figure 2:
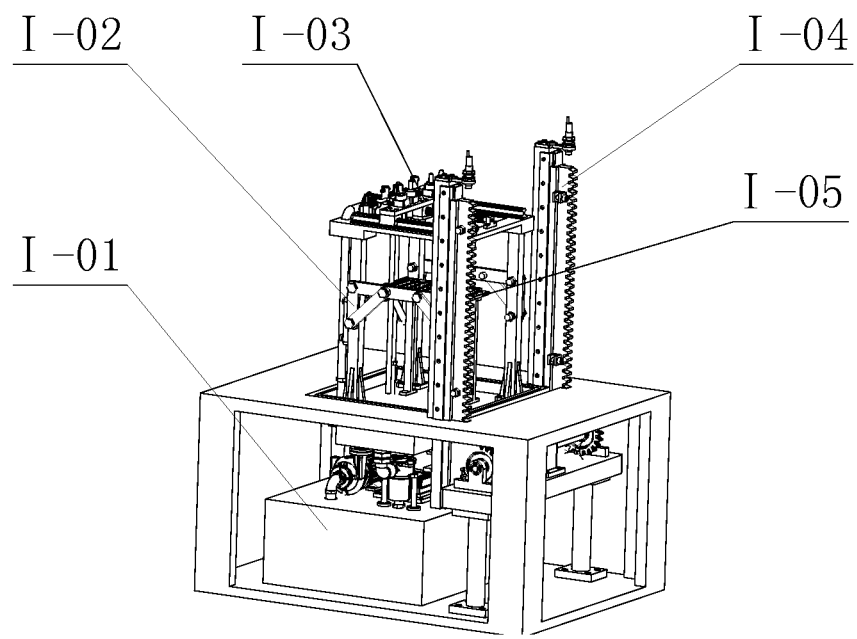
FIG. 2 is an axonometric diagram of a blade water pressure cleaning device in Embodiment 1 and Embodiment 2 of the present disclosure.
Figure 3:
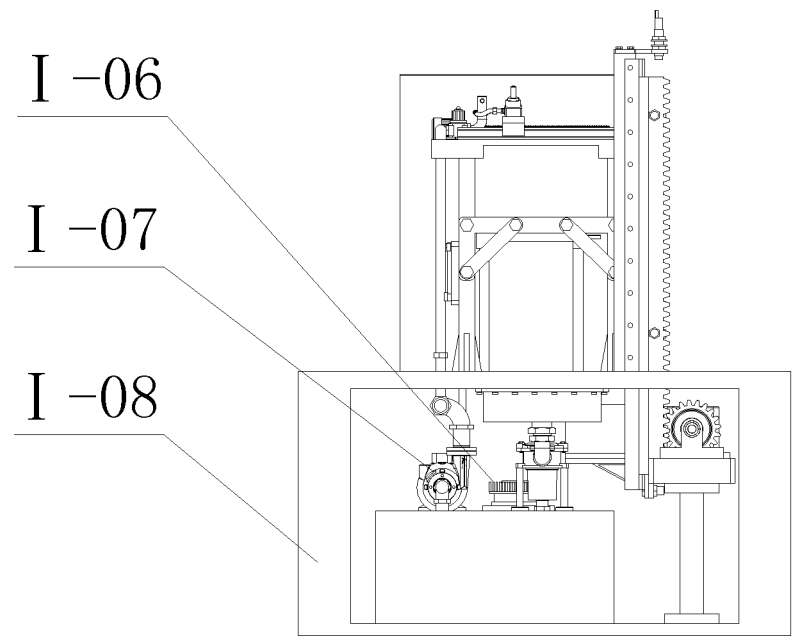
FIG. 3 is a left view of the blade water pressure cleaning device in Embodiment 1 and Embodiment 2 of the present disclosure.

In a typical implementation of the present disclosure, as shown in FIG. 1 to FIG. 3, a carbide blade cleaning device is provided.

A cutter head completing blade periphery grinding is conveyed into a blade water pressure cleaning device I, a blade ultrasonic cleaning device II and a blade air drying device III to perform blade cleaning and air drying. In the whole cleaning and air drying process, the cutter head is used as a work carrier.

The blade cleaning and air drying work process is based on the cutter head as a carrier. In the whole process, the blade does not need to be taken out from the cutter head, so that the processes of taking out the blades from the cutter head and reloading the cutter heads after cleaning and air drying are reduced. The cleaned blades are still regularly placed in a cutter head rectangular cutter groove, and the cutter head can be continuously used as a work carrier in the subsequent technical processing process of the carbide blade, so that the number of blade loading and unloading work times is reduced, the production efficiency is improved, and the blade production technical process is optimized.

After the unloading, the blade is flushed with high-pressure water jet flushing, then put into the ultrasonic cleaning device for deep cleaning, and finally air-dried under the effect of heated compressed air.

The water pressure cleaning device, the ultrasonic cleaning device, and the air drying device are included. The water pressure cleaning device includes a cleaning chamber for accommodating a cutter head and a water jet mechanism with an output end facing the cutter head. The ultrasonic cleaning device includes a cleaning box and a cutter head fixing box provided with an opening in a side surface for accommodating the cutter head, and a first telescopic mechanism drives the cutter head fixing box to adjust a relative position to the cleaning box. The air drying device includes a cutter head fixing table and an air drying mechanism with an output end facing the cutter head fixing table.

Specifically, in conjunction with the drawings, the structure of each portion in the present embodiment is described in detail.

The blade water pressure cleaning device I is composed of a water supply box unit I-01, a water jet device fixing frame I-02, a water jet device I-03, a cleaning chamber unit I-04, a cutter head fixing seat I-05, a motor controller I-06, a water pressurizing unit I-07 and a cleaning device installing base I-08.

The water supply box unit adopts a water circulation work mode, and is connected to a water outlet of a bottom plate of the cleaning chamber. Impurities in recirculation water are filtered by a recirculation filter I-0103, and a filter element of the recirculation filter is regularly replaced to ensure that circulation water meets a cleaning requirement. At the same time, a net type filter screen is disposed between the recirculation pipe and a water tank for secondary filtration of the recirculation water.

The cleaning water circulation work mode is adopted, so that the green manufacturing requirement is met, industrial water is saved to a great degree. Most impurities are gathered on the filter element of the recirculation filter and the net type filter screen, and the recovery treatment of the impurities is facilitated. At the same time, the treatment cost of cleaning waste water is reduced, and the blade production cost is further reduced.

Oil impurities such as grinding fluid and metal abrasive particles in tiny sizes are contained in water after blade cleaning. In order to improve the recirculation water filtering effect, the recirculation filter I-0103 in the device uses a sallow layer sand filter with a two-way automatic flushing valve and having a washing filtering state and a back washing state.

In the blade high-pressure flushing work process, the recirculation filter is in the washing filtering state to continuously filter away impurities in the recirculation water. With the continuous accumulation of the impurities in a filter material layer in the filter, internal pressure head loss will be continuously increased. When the water inlet and outlet pressure head loss reaches a set value, a constant pressure device is automatically activated so that the filter is converted to a back washing state, and the state is recovered to the washing filtering state after the impurities in the filter are removed.

The recirculation water flows out from a water outlet of the recirculation filter I-0103, and then passes through the net type filter to flow back into a water supply box.

The net type filter uses a filter screen to intercept impurities, oil pollution and the like in raw water to further purify the water quality. A water level display pipe I-0101 and a water supply box water change valve I-0106 are disposed at the bottom of the water tank. With the increase of the back washing times of the filter, cleaning water needs to be timely added after the water level of the water tank is decreased.

A water supply box top cover I-0102 is removable, and a top recirculation filter I-0103 is connected to a cleaning device installing base I-08 through screws.

Figure 4A:
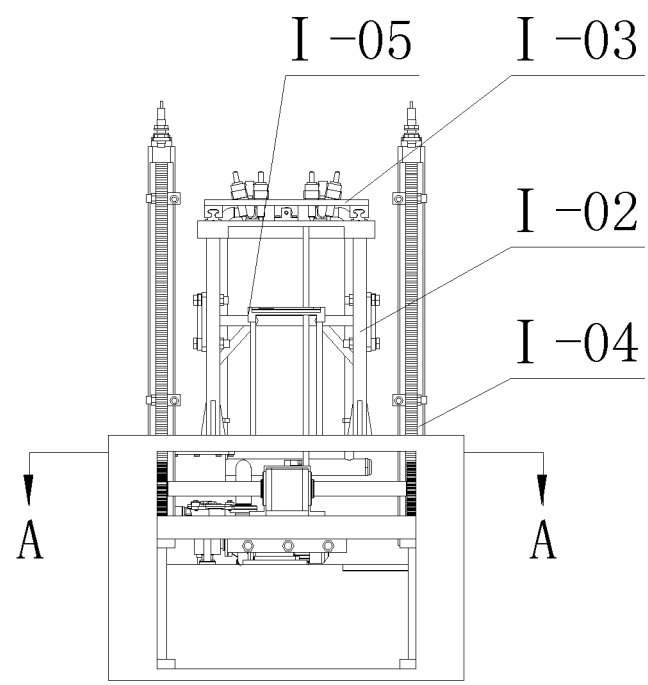
FIG. 4(a) is a front view of the blade water pressure cleaning device in Embodiment 1 and Embodiment 2 of the present disclosure.
Figure 4B:
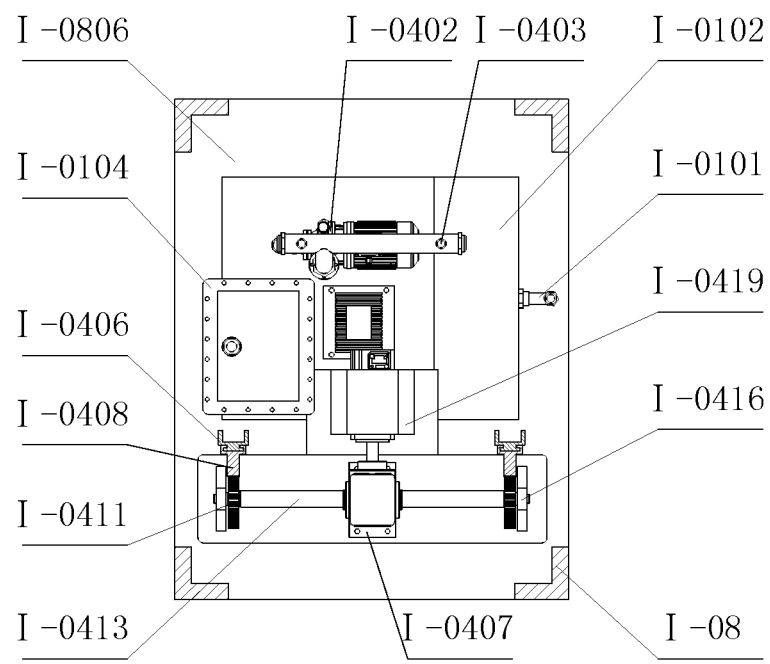
FIG. 4(b) is a sectional view along A-A in FIG. 4(a).
Figure 5:
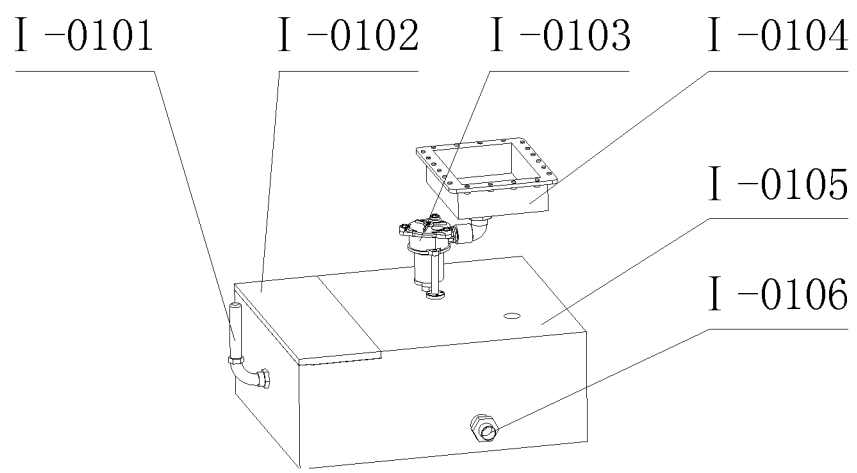
FIG. 5 is an axonometric diagram of a water supply unit of the blade water pressure cleaning device in Embodiment 1 and Embodiment 2 of the present disclosure.
Figures 12, 13:
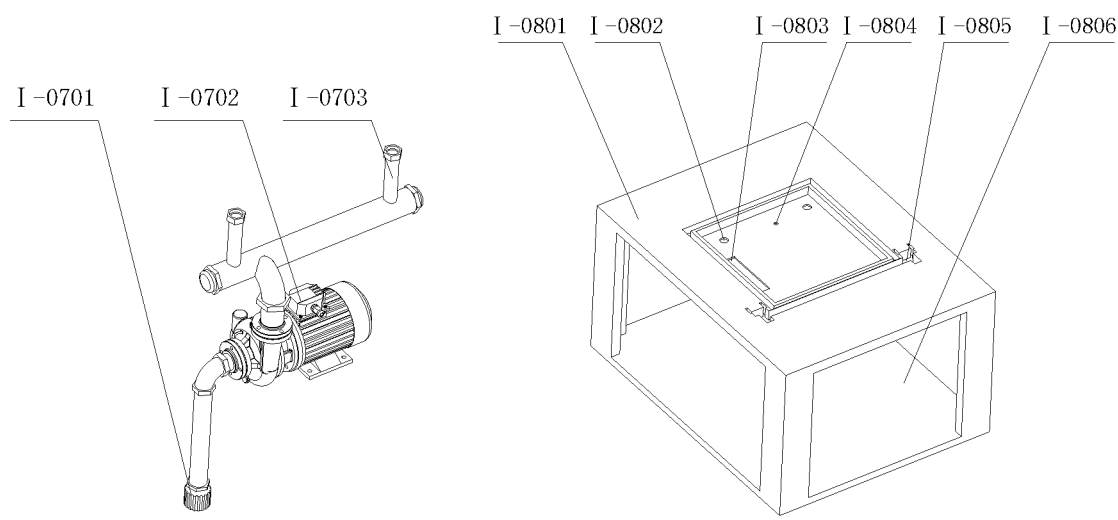
FIG. 12 is an axonometric diagram of a water supply unit apparatus of the blade water pressure cleaning device in Embodiment 1 and Embodiment 2 of the present disclosure.
FIG. 13 is a component installing base of the blade water pressure cleaning device in Embodiment 1 and Embodiment 2 of the present disclosure.

A water supply box top plate is fixedly connected to a pressure water pump I-0702 through bolts, is connected to the water tank through a water pumping pipe, and is provided with a water pumping pipe bottom filter I-0701 to filter the cleaning water. The water pressurized by the pressure water pump is supplied into the water jet device I-03 through a pressure water pump water outlet pipe I-0703, and the front view of the blade water pressure cleaning device is as shown in FIG. 4(a). A plane position relationship diagram of the cleaning water pressurizing unit and the water supply unit device is as shown in FIG. 4(b). The axonometric diagram of the water supply unit of the blade water pressure cleaning device is as shown in FIG. 5. The axonometric diagram of the cleaning water pressurizing unit device is as shown in FIG. 12.

Figure 6A:
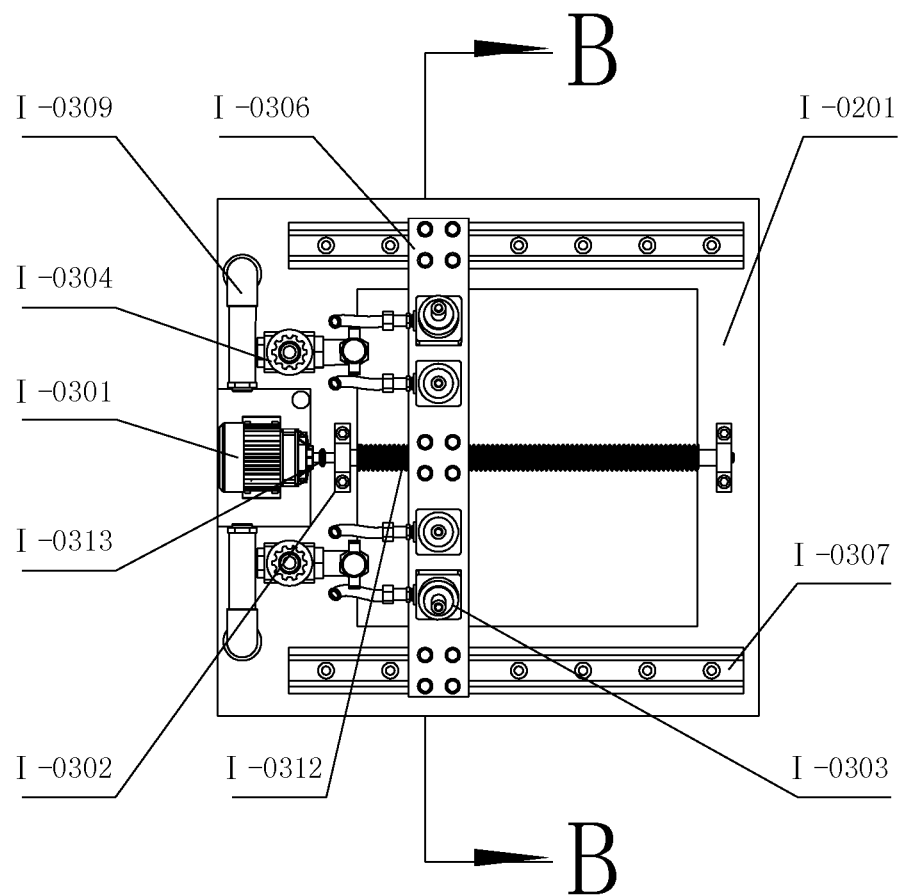
FIG. 6(a) is a top view of a water jet unit of the blade water pressure cleaning device in Embodiment 1 and Embodiment 2 of the present disclosure.
Figure 7:
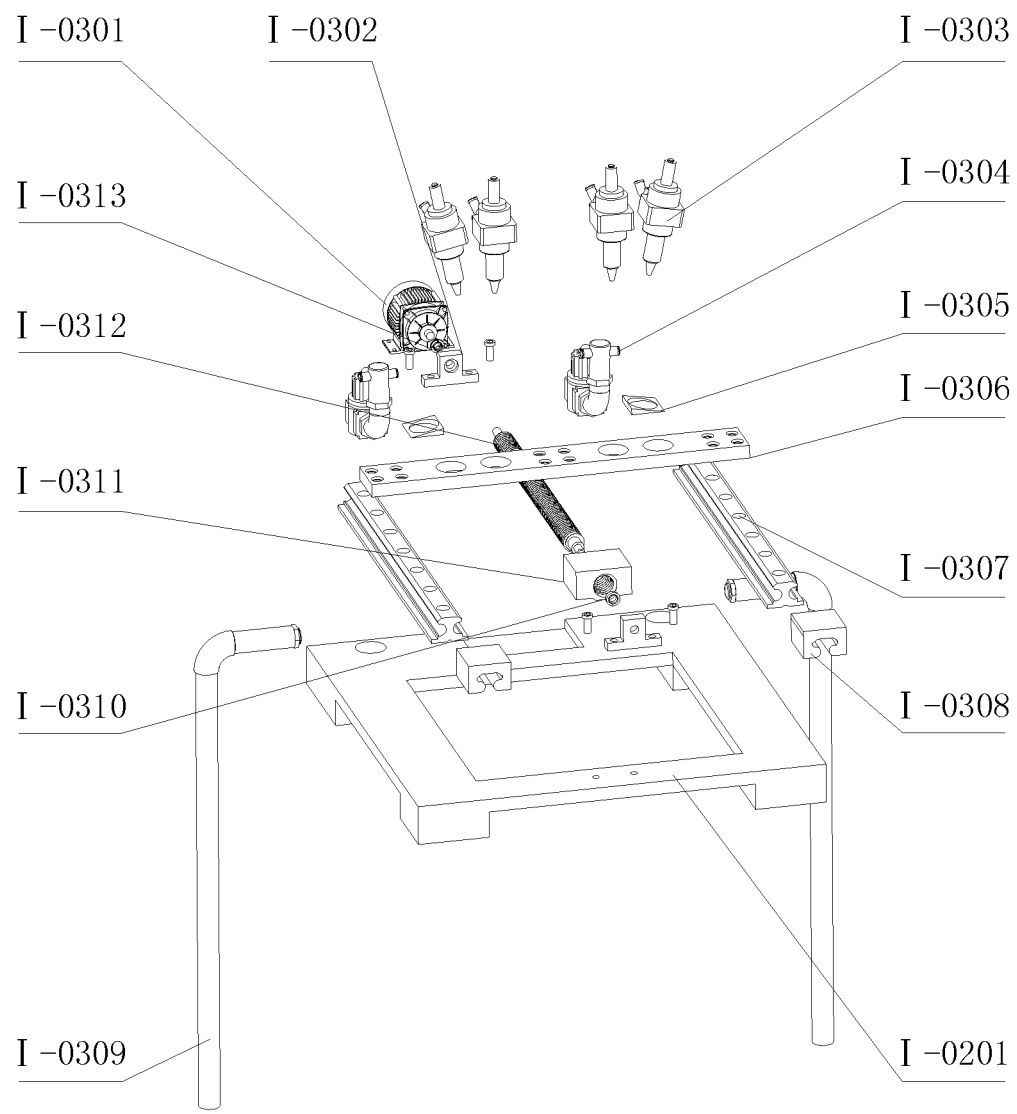
FIG. 7 is an exploded view of an assembly component of the water jet unit of the blade water pressure cleaning device in Embodiment 1 and Embodiment 2 of the present disclosure.
Figure 11C:
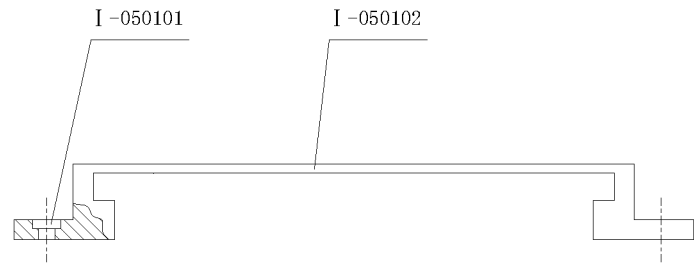
FIG. 11(c) is a front view of the blade high-pressure water jet cleaning cutter head fixing box in Embodiment 1 and Embodiment 2 of the present disclosure.

The top view of the water jet device I-03 is as shown in FIG. 6(a), and mainly composed of a spray nozzle lead screw driving motor I-0301, a spray nozzle lead screw end portion support seat I-0302, a water jet spray nozzle I-0303, a water jet electromagnetic control switch I-0304, a spray nozzle cushion block I-0305, a spray nozzle fixing plate I-0306, a water jet spray nozzle feeding guide rail I-0307, a water jet spray nozzle feeding sliding block I-0308 and a water supply pipe I-0309. The exploded view of an assembly component is as shown in FIG. 7.

High-pressure water flows of cleaning water are jetted out through the spray nozzle to directly flush the surface of the blade. The cleaning water mixed with grinding impurities flows out from a through hole in the bottom surface of the cleaning cutter head I-0502, and recirculates into the water supply box through a recirculation water cleaning device.

The spray nozzles are disposed on the spray nozzle fixing plate I-0306. When the spray nozzles at the outer side are installed, through a spray nozzle cushion block I-0305, the spray nozzles are at an angle to the blade flushing surface, and the spray nozzles at the inner side are vertical to the blade flushing surface. In the working process, the high-pressure water flows are sprayed out from different directions, so that the blade end surfaces and edges are flushed to the maximum degree.

Figure 6B:
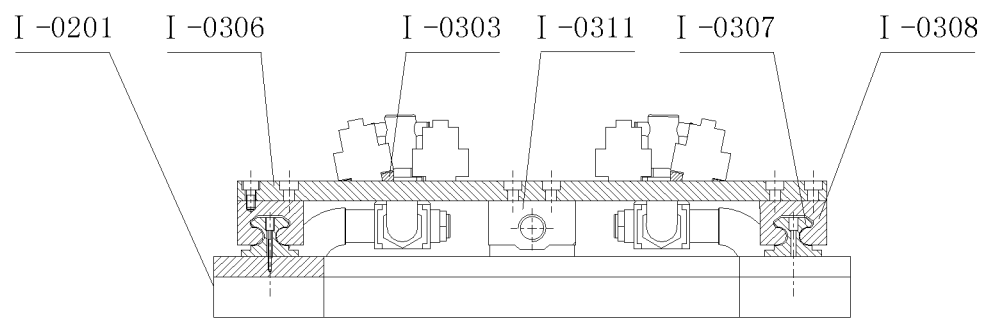
FIG. 6(b) is a sectional view along B-B in FIG. 6(a).

Two ends of the spray nozzle fixing plate I-0306 are fixedly connected onto the water jet spray nozzle feeding sliding block I-0308 through bolts. The middle is connected to a lead screw nut block I-0111. A spray nozzle driving lead screw I-0112 is driven to rotate through the spray nozzle lead screw driving motor I-0301. The lead screw nut block drives the spray nozzle fixing plate to do linear movement, and the water jet spray nozzle feeding guide rail I-0307 and the water jet spray nozzle feeding sliding block I-0308 improve the linear feeding stability of the spray nozzle fixing plate, as shown in FIG. 6(b).

Two ends of the water jet electromagnetic control switch I-0304 are water flow inlet and outlet openings. A water outlet and a spray nozzle water inlet are connected through a high-pressure-resistant flexible material water pipe. The length of the water pipe is greater than the maximum stroke of a linear feeding guide rail, ensuring that the length of the water pipe meets the requirement when the spray nozzle is fed to the maximum stroke. The water inlet is directly connected to the water supply pipe I-0309 through a pipeline.

The whole high-pressure water pipeline is provided with an overflow valve. When the water pipe pressure rises due to unexpected conditions, the pipeline pressure can be adjusted through the overflow valve, and the occurrence of a fault is avoided.

In engineering fluid mechanics, the high-pressure water jet of the device belongs to a thick-wall hole opening and pipe nozzle outward extending continuous jet mode. According to a fluid continuity equation and a Bernoulli's equation, a concept of area ratio is introduced to obtain a relational expression of a flow rate Q: $Q=C_q A[2(gH+\Delta p/\rho)]^{1/2}$.

A is an inlet cross section area, H is an outlet height, $\rho$ is a fluid density, g is a gravity acceleration, $\Delta p$ is a pressure difference, and $C_q$ is a flow rate coefficient.

Through the above formula, it can be seen that the flow rate is relevant to the outlet cross section area, the height and the pressure difference. In the high-pressure water jet system, the height of the spray nozzle outlet is ignorable. After the pressure adjustment is completed, the pressure difference is a constant value, and thus the flow rate change of the high-pressure water jet can be realized by changing the cross-section area of the spray nozzle outlet.

In the practical processing process, the automation degree of the device will be reduced by changing the spray nozzles with water outlets of different sizes, so that the water jet device I-03 of the system is provided with a proportional pressure adjusting valve and a proportional flow rate valve between the water jet electromagnetic control switch I-0304 and the water jet spray nozzle I-0303. A high-pressure water jet control system collects data of a pressure sensor and a flow rate sensor in the pipeline, and controls the action of the proportional pressure adjusting valve and the proportional flow rate valve, so that water at the specific pressure and flow rate is generated and jetted out from the water jet spray nozzle I-0303.

The water pressure required by the cleaning process of the blades with different appearances is different. The water jet cleaning device can adjust the water jet parameters according to the blades of different models and specifications. On the premise of ensuring the cleaning effect, the energy source consumption is reduced, and the universality and the automation degree of the apparatus are improved.

The high-pressure water blade cleaning process is completed in the closed space cleaning chamber unit I-04. The front view of the cleaning chamber is as shown in FIG. 8(*a*). A side wall plate and a front baffle both use a transparent material, and the side wall plate is of an integral structure, and directly disposed in a groove of a base top plate I-0801.

The front baffle is connected to a mechanical lifting device. In the cutter head loading and unloading process, the front baffle is driven to descend by a certain height by the lifting device, and a cleaning chamber cutter head loading door is opened, so that a manipulator conveys the cutter head. In the blade cleaning process, the front baffle ascends to the top end, so that the cleaning chamber forms a closed space, and the blade in the cutter head is cleaned under the high-pressure water jet effect.

The lifting device is implemented by the mechanical device. The lifting work of the front baffle is completed by driving components such as a gear and a rack by a motor. The top view of the device is as shown in FIG. 9(*a*).

The periphery of the front baffle is fixed onto a front baffle fixing pin I-0402 through screws, and the fixing pin is connected onto a front baffle fixing rack I-0408 with a sliding groove through end portion threads, as shown in FIG. 9(*b*). A front baffle driving motor I-0418 is connected to a rotating shaft direction changer I-0407 through a coupling, then direction changer left and right rotating shafts are driven to rotate, then a gear I-0411 is driven to rotate, and the rack is further driven to complete the linear movement in the vertical direction, completing the lifting of the front baffle.

The gear I-0411 is connected to the direction changer rotating shaft through a key, and the outer end is connected to a bearing sleeve in cooperation with a bearing and a bearing block to realize axial positioning. The direction changer rotating shaft is connected onto a direction changer fixing plate I-0410 through bearing block screws at two ends, as shown in FIG. 8(*b*). The above device bolts are further fixed onto the base top plate I-0801 through a direction changer fixing plate base I-0412 to complete the integral fixation of the front baffle device. The loading and unloading instructions of the cleaning chamber unit I-04 are from an external cutter head loading and unloading robot IV, and according to the processing work conditions, the front baffle performs corresponding lifting action.

A guide rail fixing post I-0405 is provided with a position limiting switch I-0403 through a position limiting switch fixing clamp I-0404, as shown in FIG. 9(*c*). The position limiting switch is a distance sensor, and collected information is fed back to the front baffle driving motor I-0418 for controlling the lifting height of the front baffle in a reasonable range.

A water outlet pipe through hole I-0802 and an electric wire pipe through hole I-0804 are formed in a top plate region of an inside workbench of a cleaning chamber side wall plate installing groove of the cleaning device installing base I-08. At the same time, a cleaning water collecting hole I-0803 is formed to facilitate the collection and recirculation of the water. The top plate plane of the workbench has a certain slope, and the lower end is near the cleaning water collecting hole, so that the recirculation speed of the cleaning water is accelerated. A cleaning water collecting box I-0104 is disposed in the periphery of the lower end of the cleaning water collecting hole.

The blade completing the high-pressure water flow flushing is deeply cleaned by the blade ultrasonic cleaning device II.

Figure 14A:
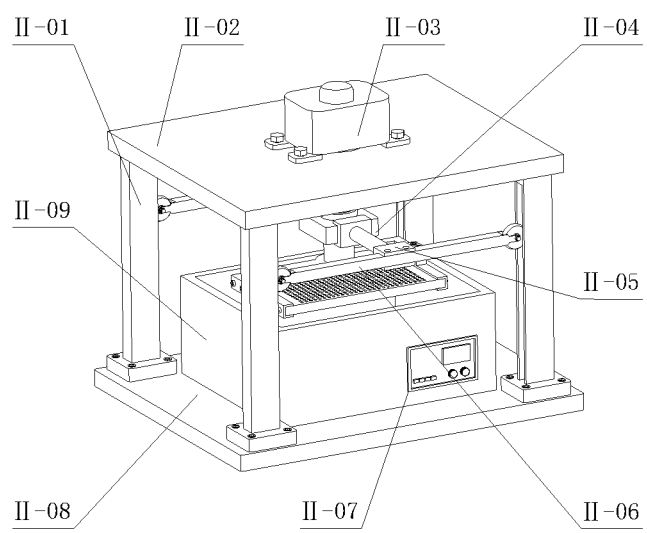
FIG. 14(a) is an axonometric diagram of a blade ultrasonic cleaning device in Embodiment 1 and Embodiment 2 of the present disclosure.
Figure 14B:
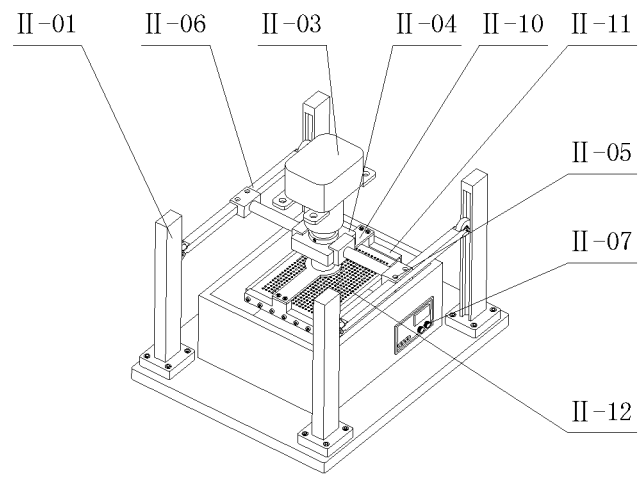
FIG. 14(b) is an axonometric diagram of the blade ultrasonic cleaning device with top cover removed in Embodiment 1 and Embodiment 2 of the present disclosure.

The axonometric diagram of the ultrasonic cleaning device II is as shown in FIG. 14(*a*). The axonometric diagram of the ultrasonic cleaning device II with top cover removed is as shown in FIG. 14(*b*). A core work component is an ultrasonic cleaning box II-09, and is disposed and fixed onto an ultrasonic cleaning device bottom plate II-08.

In the work process, the cutter head is conveyed into a cutter head fixing box II-12 through an external cutter head loading and unloading robot IV, the cutter head fixing box enables the cutter head to be immersed into the cleaning box under the action of the telescopic air cylinder for blade ultrasonic cleaning.

The cutter head fixing box is disposed on the cleaning box through an ultrasonic cleaning support frame. The cutter head fixing box is connected to the ultrasonic cleaning support frame through the telescopic air cylinder, and the cutter head fixing box is driven under the action of the telescopic air cylinder to enter or retreat from a work groove of the cleaning box.

An opening is formed in each of a pair of side surfaces of the cutter head fixing box, side surfaces adjacent to the side surfaces with the openings are connected to the telescopic air cylinder. A plurality of cleaning holes communicating with the inside of the cutter head fixing box are formed in each of a top plate and a bottom plate of the cutter head fixing box.

Figure 15:
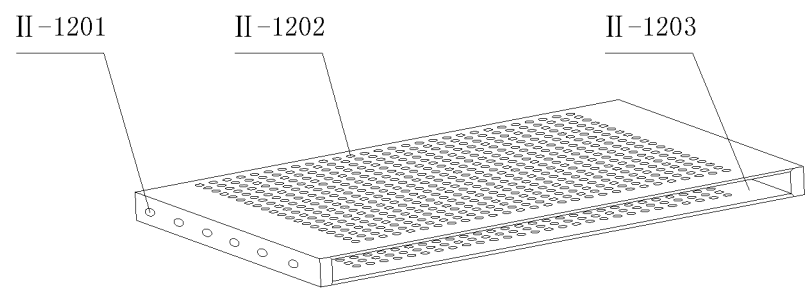
FIG. 15 is a blade ultrasonic cleaning cutter head fixing box in Embodiment 1 and Embodiment 2 of the present disclosure.

The axonometric diagram of the cutter head fixing box II-12 is as shown in FIG. 15. The cutter head is loaded and unloaded through a cutter head feeding opening II-1203. Cutter head fixing box cleaning holes II-1202 are uniformly and densely distributed in the upper and lower end surfaces of the cutter head fixing box. Cutter head fixing box side wall connecting holes II-1201 are provided in the side wall of the cutter head fixing box. The cutter head fixing box is fixed onto a cutter head fixing box fixing plate II-11 through socket head cap screws and further connected onto a hollow connecting plate II-10.

A center position of the hollow connecting plate is a cylinder hole. A lower end cylinder region of the telescopic air cylinder II-03 passes through the cylinder hole, and the two components are fixedly connected through side wall screws. An ultrasonic cleaning control plate II-07 obtains an external control signal and controls the action of the telescopic air cylinder II-03, and in the air cylinder telescopic process, the cutter head is driven to ascend and descend in a vertical direction.

In order to improve the work stability of the lifting device, components such as a rolling wheel side rod fixing frame II-05, a rolling wheel side rod II-06 and a rolling wheel side rod fixing frame connecting block II-04 are added to provides an auxiliary guide effect in the cutter head lifting process, and thus the system movement stability is improved.

After the blade is ultrasonically cleaned, the surface cleanness meets the subsequent processing requirements. In order to improve the production line processing rhythm and enable the previous and later work procedures to be orderly connected, the cleaned blade is fast dried through the blade air drying device III, and moisture on the surfaces of the blade and the cutter head is removed.

The blade moisture removal in the system adopts an air drying mode by compressed air. A cooling device and an oil-water separator are provided in the device for pretreatment of the compressed air, ensuring that the compressed air is dry and oilless. At the same time, a compressed air heating device is configured to heat the pretreated compressed air, and the high-temperature dry compressed air is used for fast removing moisture on the surface of the blade in a concentrated blowing mode.

The air drying mechanism includes an air source for outputting hot air and an air drier capable of adjusting a relative position to the cutter head fixing table. The air drier communicates with the air source, and an output end of the air drier is provided with a ventilation chamber corresponding to a blade cutter head storage station for correspondingly air-drying a workpiece positioned on a blade cutter head.

The cutter head fixing table cooperates with a lead screw sliding block mechanism. The lead screw sliding block mechanism cooperates with a positioning sliding block. The positioning sliding block cooperates with the cutter head fixing table to form a cutter head clamp for pushing the cutter head from the two sides and positioning and clamping.

Specifically, in the present embodiment, in the previous work, the blade is subjected to high-pressure water jet and ultrasonic deep cleaning, and no impurity is remained in moisture remained on the surface. Therefore, an air pipeline of the blade air drying device uses an open loop design, and a main ingredient of air after the blade air drying and circulation is water vapor capable of being directly discharged without air pollution.

Figure 16:
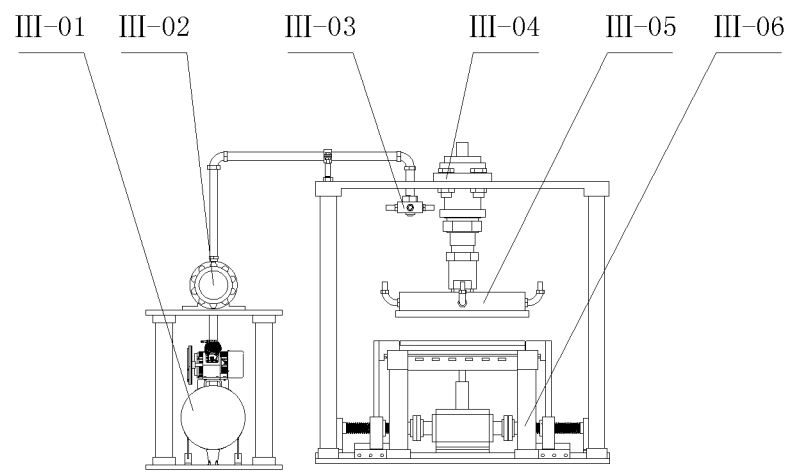
FIG. 16 is a front view of a blade air drying device in Embodiment 1 and Embodiment 2 of the present disclosure.
Figure 26:
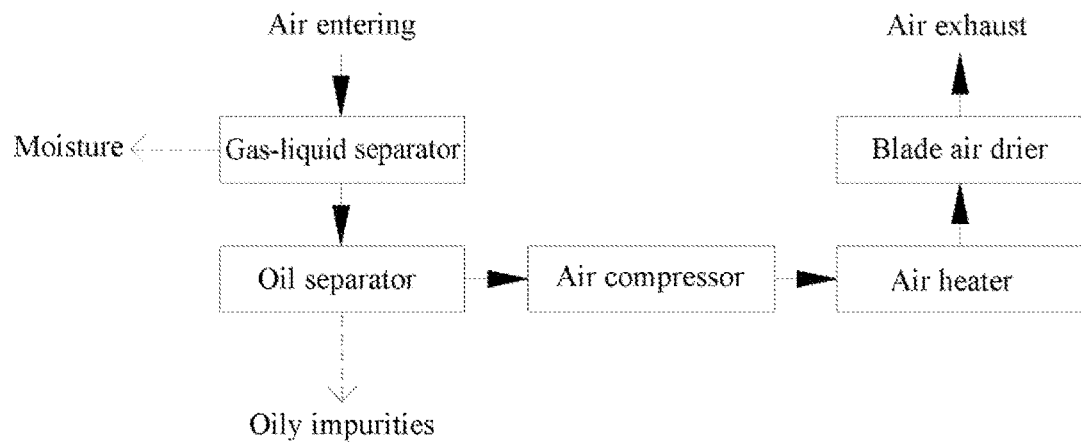
FIG. 26 is a principle diagram of blade air drying by compressed air in Embodiment 1 and Embodiment 2 of the present disclosure.

The front view of the blade air drying device III apparatus is as shown in FIG. 16. The work principle of the blade air drying gas is as shown in FIG. 26.

The compressed air is generated through an air compressor III-01, and the device can also be directly connected into a production line provided with a compressed air power system, so that the apparatus cost of the air compressor is reduced, energy sources in a factory can be sufficiently utilized, and at the same time, the production space of parts is saved.

Figure 19:
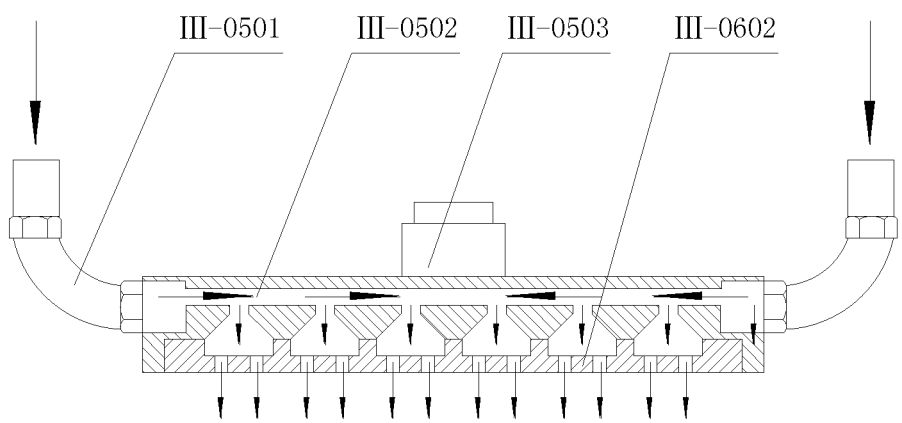
FIG. 19 is a schematic circulation diagram of compressed air for blade air drying in Embodiment 1 and Embodiment 2 of the present disclosure.

The compressed air with oil and water removed enters a compressed air heater III-02 through a high-pressure conveying pipeline, and the temperature of the compressed air is raised. Then, the compressed air is conveyed to a compressed air diverter III-03. The compressed air diverter is internally provided with a pressure control switch that can feed back to control the on-off state of the air compressor can be controlled in a feedback manner. A flow division channel is disposed and connected to an air inlet of a blade air drier III-05 through a high-pressure-resistant hose. In the work state, the lower end surface of an air outlet hole of the blade air drier directly approach to the upper surface of the cutter head under the driving of the telescopic air cylinder III-04. The quantity and the distribution form of the air outlet holes of the air drier are the same as those of cutter head blade accommodating rectangular grooves. In the air drying process, the position relationship of the two components is as shown in FIG. 19.

The compressed air is transferred between different apparatus components through an air pipe. The air pipe is designed mainly according to the design process requirements, the arrangement of the air pipe in the system is determined, and the size and the material of the air pipe are selected. In the device, the material of the air pipe selects a PVC steel wire plastic hose, heat insulation cotton is added to the outside of the pipe for heat insulation design, and the air heat convection of the compressed air and the outside is reduced.

The compressed air will generate pressure loss in the pipeline transmission process. The final air drying effect and the work efficiency of the blade have a direct relationship with the pressure and the temperature of the compressed air. The temperature can be adjusted and controlled through the compressed air heater III-02. The pipeline is provided with a heat insulation device along the path, and the temperature loss is ignorable.

When the compressed air flows in components such as the pipeline and the valve, the pressure loss generated includes on-way pressure loss $\Delta P_l$ and local pressure loss $\Delta P_w$. A calculation formula of the on-way pressure loss $\Delta P_l$ is as follows:

$$\Delta P_l = \lambda \frac{lu^2}{2d} \rho.$$

In the formula, $\Delta P_l$ is on-way resistance of the pipeline, $\lambda$ is a friction resistance coefficient, and generally, for a metal pipe, λ=0.02, μ is a flow velocity of the air, l is the length of the air pipe, d is the diameter of the air pipe, and ρ is the average air density.

For the local pressure loss calculation, calculation values of pipeline variable cross sections and elbows are generally used as system design reference values. With ordinary big and small variable cross sections and right-angle elbows taken for calculation, a calculation formula of $\Delta P_w$ is as follows:

$$\Delta P_W = n\xi \frac{u^2}{2} \rho.$$

In the formula, $\Delta P_w$ is local pressure loss, n is a quantity of variable cross sections or elbows, ξ is a local resistance coefficient, for a square pipeline 90° right-angle elbow, ξ=about 0.4, and for a medium-degree variable cross section, ξ=0.2 to 0.5.

The total resistance loss ΔP of the compressed air is a sum of the on-way pressure loss and the local pressure loss: $\Delta P = \Delta P_L + \Delta P_W$.

During device pressure system design, the pressure loss part in the above transmission process is considered for the pressure calculation of the compressed air at the outlet of the air drying device. In order to ensure the air drying effect, the cutter head needs to be placed to coincide with the plane center line of the air drier, so that the air outlet of the air drier approaches to the blade to the maximum degree.

Figure 17A:
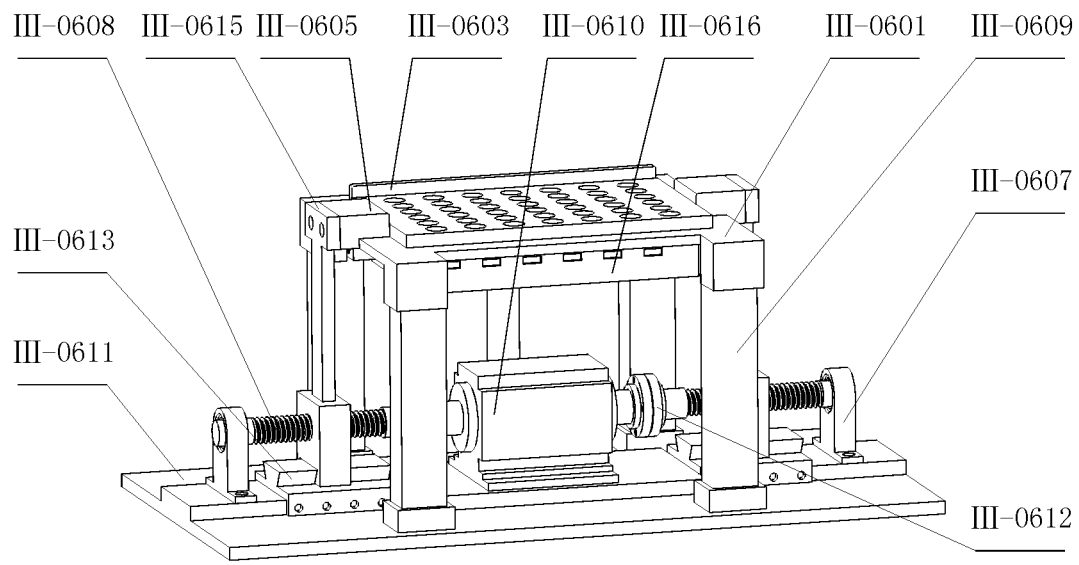
FIG. 17(a) is an axonometric diagram of a cutter head fixing apparatus of the blade air drying device in Embodiment 1 and Embodiment 2 of the present disclosure.
Figure 17B:
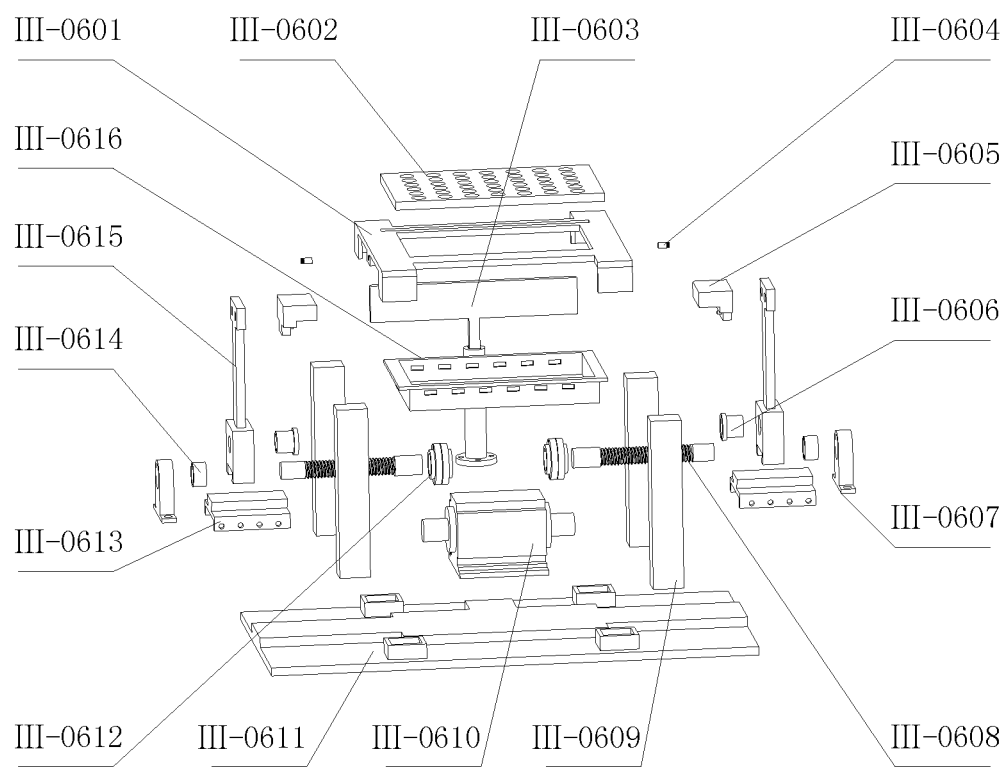
FIG. 17(b) is an exploded view of an assembly component of the cutter head fixing apparatus of the blade air drying device in Embodiment 1 and Embodiment 2 of the present disclosure.

The cutter head fixing table III-06 of the device is provided with a cutter head self-positioning device, as shown in FIG. 17(a). The exploded view of the component assembly is as shown in 17(b). The positioning device is realized through a cutter head loading Y axis positioning plate III-0603 and an X axis positioning sliding block III-0615. During cutter head loading, the cutter head is put onto the cutter head fixing table III-06 by the cutter head loading and unloading robot IV. In the cutter head loading process, it is ensured that the cutter head is placed on a workbench after the side wall is against the cutter head loading Y axis positioning plate III-0603. At this moment, in the Y axis direction, the position relationship of the cutter head in the air drying process is met.

After the cutter head is placed, the X axis positioning sliding block III-0615 starts to move in the center direction, and finally, the left and right sliding blocks abut against the side wall of the cutter head at the same time, completing the X axis direction positioning of the cutter head is completed.

The bottom of the X axis positioning sliding block is provided with a cylindrical probe. In the positioning process, when the probe is in contact with a pressure sensor III-0604 disposed in a cutter head air drying fixing table III-0601 and reaches a set pressure threshold, it indicates that the cutter head is in a correct work position. At this moment, the X axis positioning sliding block reversely moves to leave far away from the cutter head, leaving a work space for the blade air drier. The blade air drier vertically presses down, and a lower bottom surface groove covers the cutter head.

Under the effect of the pressure, a cutter head baffle III-060301 retreats and descends, the upper end surface of the cutter head baffle III-060301 is in contact with the lower bottom surface of the blade air drier, a baffle compression spring III-060302 is compressed, and the cutter head baffle bears the acting force of the baffle compression spring. After the blade drying is completed, and the blade air drier ascends, the cutter head baffle III-060301 is automatically rebound to an initial position under the effect of the spring force.

The structure of the cutter head loading Y axis positioning plate III-0603 is as shown in FIG. 18, and the cutter head loading Y axis positioning plate is connected onto a cutter head positioning table base III-0611 through bolts of a baffle fixing seat III-060303.

Figure 17C:
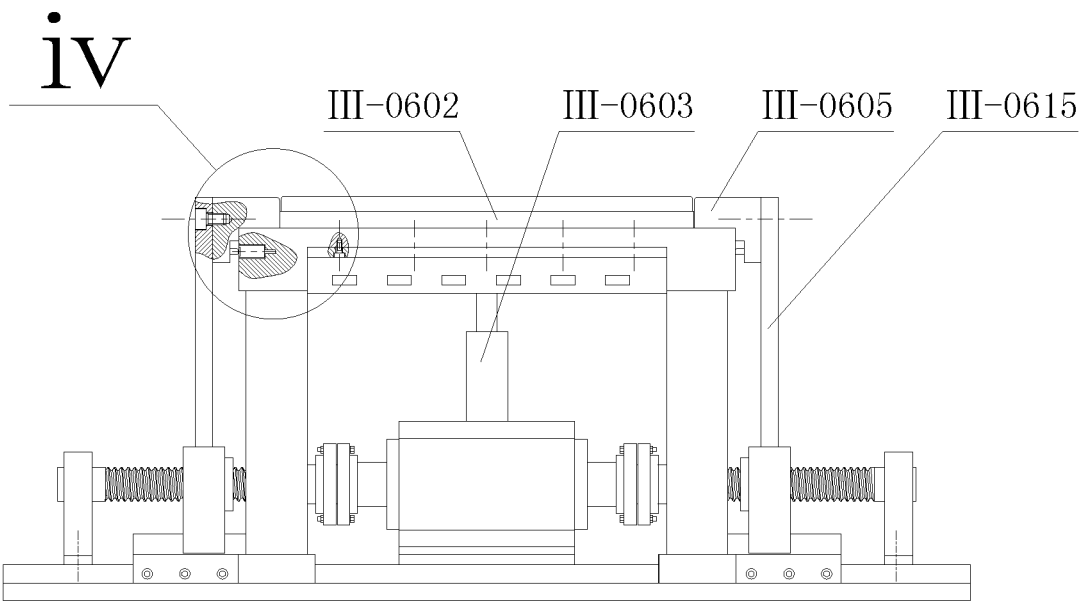
FIG. 17(c) is a front view of the cutter head fixing apparatus of the blade air drying device in Embodiment 1 and Embodiment 2 of the present disclosure.
Figure 17D:
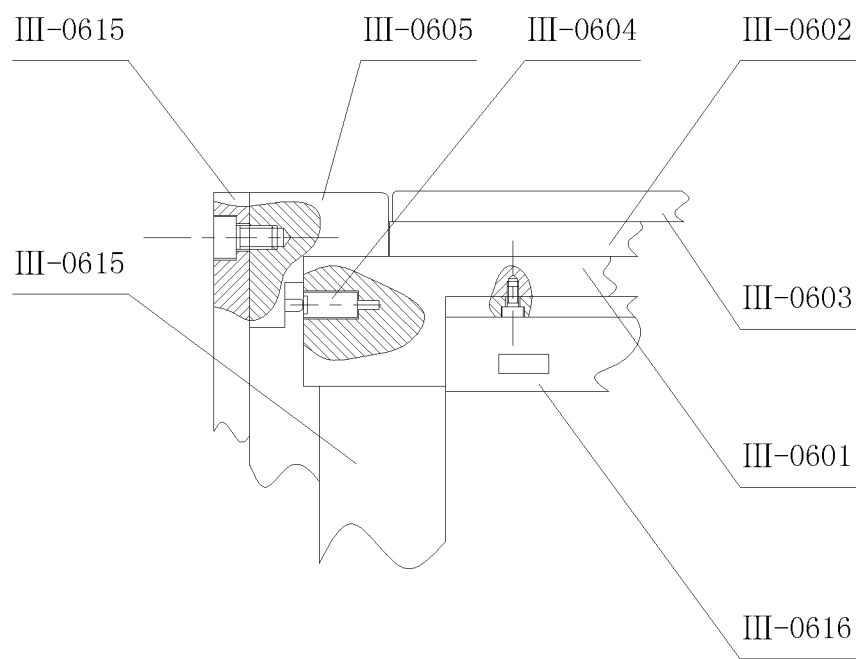
FIG. 17(d) is a local enlarged view of a position iv in FIG. 17(c).
Figure 18A:
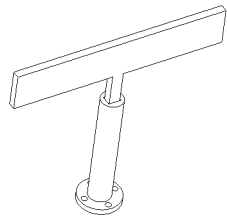
FIG. 18(a) is an axonometric diagram of a cutter head loading side edge fixing plate in Embodiment 1 and Embodiment 2 of the present disclosure.
Figure 18B:
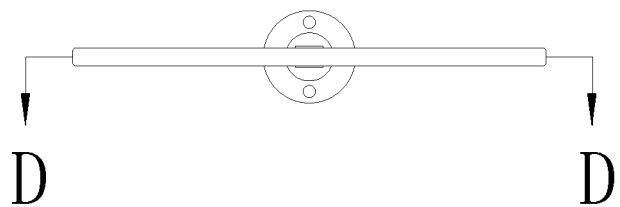
FIG. 18(b) is a top view of the cutter head loading side edge fixing plate in Embodiment 1 and Embodiment 2 of the present disclosure.
Figure 18C:
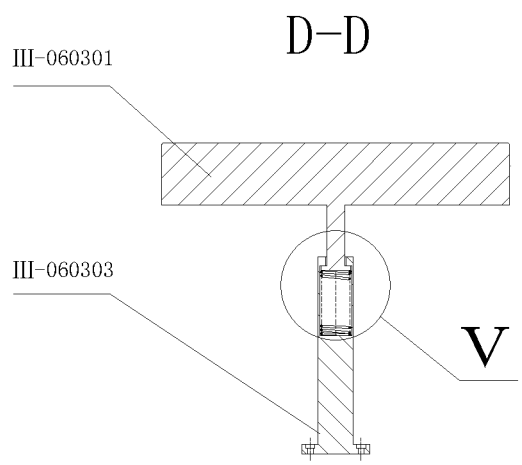
FIG. 18(c) is a sectional view along D-D in FIG. 18(b).
Figure 18D:
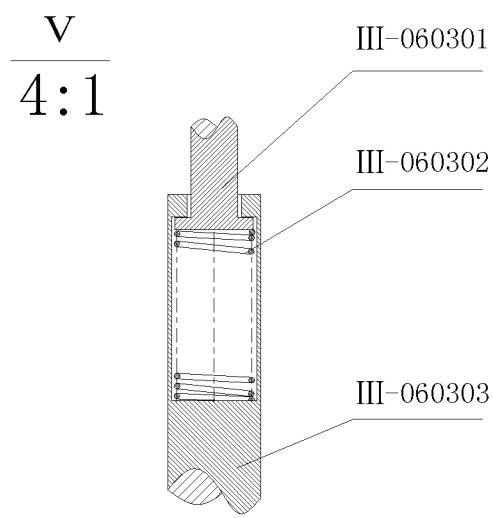
FIG. 18(d) is a local enlarged view of a position v in FIG. 18(c).

The positioning moving implementation of the X axis positioning sliding block is that a lead screw is driven by a motor and a nut is further driven to rotate, which converts the rotation movement into linear movement. A specific implementation form is as follows: left and right end shafts of a double-shaft motor III-0610 are connected to positioning block driving lead screws III-0608 with opposite rotating directions through positioning lead screw couplings III-0612. The outer end of the lead screw is supported and fixed onto the base through a bearing and a bearing block. A Positioning block lead screw nut III-0606 cooperate with the lead screw for installation. The end surface is connected to the X axis positioning sliding block III-0615 through screws, and the X axis positioning sliding block III-0615 is connected to a cutter head loading X axis positioning block III-0605 through screws. Through the above components, the forward and reverse rotation movement of the motor is changed into the X axis linear movement of the positioning block. The lower end of the X axis positioning sliding block III-0615 is provided with a sliding groove. Through the guide effect of X axis sliding rail III-0613, the stable movement of the cutter head loading X axis positioning block III-0605 is realized. The axonometric diagram of the cutter head fixing table III-06 is as shown in FIG. 17(a), and the front view is as shown in FIG. 17(c).

The periphery grinding machine cutter head automatic loading and unloading and blade cleaning and air drying functions are achieved. The labor intensity in blade periphery grinding cutter head loading and unloading processes is reduced, the loading and unloading timeliness of each machine tool is guaranteed, and the processing efficiency of the blade periphery grinding is improved.

Embodiment 2

In another typical implementation of the present disclosure, as shown in FIG. 1 to FIG. 3, a carbide blade cleaning system is provided, and the carbide blade cleaning device in Embodiment 1 is utilized.

FIG. 1 shows an axonometric diagram of a cutter head loading and unloading system applied to a carbide blade periphery grinding machine. The cutter head loading and unloading system includes a blade water pressure cleaning device I, a blade ultrasonic cleaning device II, a blade air drying device III, a cutter head loading and unloading robot IV, a periphery grinding machine cutter head loading and unloading conveyor V and a periphery grinding machine cutter head transfer station VI.

Each of the above parts is provided with an intelligent control unit and a communication unit, so that all parts can realize real-time communication for information sharing. According to real-time processing conditions, under the decision of a general control system, each function module realizes the ordered operation of the blade periphery grinding machine cutter head loading and unloading and the subsequent blade cleaning and air drying work. The functions of the cutter head loading and unloading system are expanded, and at the same time, the processing efficiency of the blade periphery grinding process is effectively improved.

At an initial link of the system, a cutter head fully filled with carbide blades is put at an initial end station of the periphery grinding machine cutter head transfer stations VI manually or by a special loading apparatus, and blades in the cutter head placed in this position are blades completing end surface grinding. The cutter head is conveyed through the periphery grinding machine cutter head loading and unloading conveyor V. The main conveying work is the cutter head loading and unloading by a periphery grinding machine, and the cutter head of the blades completing the periphery grinding is conveyed to a tail end station of the periphery grinding machine cutter head transfer stations VI.

Through the cutter head loading and unloading robot IV, the cutter head completing the blade periphery grinding is conveyed to the blade water pressure cleaning device I, the blade ultrasonic cleaning device II and the blade air drying device III to clean and air-dry the blades. In the whole cleaning and air drying process, the cutter head is used as a work carrier. After the cleaning and air drying are completed, the cutter head is conveyed to the tail end station of the periphery grinding machine cutter head transfer stations VI through the cutter head loading and unloading robot IV. At the same time, the system sends a signal to a blade downstream manufacturing process apparatus to take the cutter head.

The periphery grinding machine cutter head loading and unloading conveyor V is in charge of the cutter head loading and unloading of the periphery grinding machine. Ground rails are laid between the blade periphery grinding machines. A rolling wheel driving unit is disposed at the bottom of a conveyor support seat V-15. Under the guide of the ground rails, the space position change of the cutter head loading and unloading conveyor is realized. When the grinding of all of the blades in the blade periphery grinding machine cutter head is completed, a signal is sent to the conveyor through a wireless ratio frequency device to inform that a certain grinding machine has completed the grinding machining process. A conveyor control system moves to a corresponding grinding machine position according to a space position coordinate corresponding to the serial number of a machine tool sending the signal, and the cutter head is taken down for replacement of a new cutter head to continue processing.

The periphery grinding machine cutter head loading and unloading conveyor is provided with a cutter head storage space capable of storing a certain quantity of cutter heads at the same time. The cutter heads can be dynamically taken from and put into the storage space according to the real-time processing conditions. The cutter heads completing the processing by the periphery grinding machine can be timely conveyed to the tail end station of the periphery grinding machine cutter head transfer stations VI for subsequent cleaning, and it is ensured that there are enough cutter heads for accommodating the blades to be processed in the storage space all the time. A conveyor control system uses plc to perform remote logic control on the periphery grinding machine loading and unloading and the conveying process of the cutter head transfer station.

Moreover, the device is also provided with local control. When a conversion switch switches the mode to a local control mode, the single grinding machine can be operated. At this moment, the plc control does not work. When the control system converts the mode to a plc control mode, all grinding machines on the production line enter an automatic loading and unloading work state. The plc control system builds communication connection with the system of each blade periphery grinding machine in site, and a supported communication protocol is selected according to different systems of the grinding machines in site.

The conveyor includes a support seat, a storage box disposed on the support seat and a grabber disposed on the storage box. The grabber is disposed on the storage box through a position adjusting mechanism, and the position adjusting mechanism drives the grabber to adjust a relative position to the storage box for grabbing the cutter head and putting into the storage box or taking out the cutter head from the storage box.

In the present embodiment, the cutter head grabbing of the periphery grinding machine cutter head loading and unloading conveyor is completed by a cutter head grabber V-08. In the cutter head grabber, a cutter head telescopic gripper V-0803 and a cutter head gripper rotating machine V-0802 cooperate with each other to work, realizing the axial telescopic grabbing in the plane 360° direction. At the same time, through the lifting device, the vertical movement in different height positions is realized. A cutter head temporary storage space is a certain quantity of trays which are vertically and fixedly distributed. The storage of the cutter heads in the storage space can be realized through the triaxial movement of the cutter head grabber.

Figure 22:
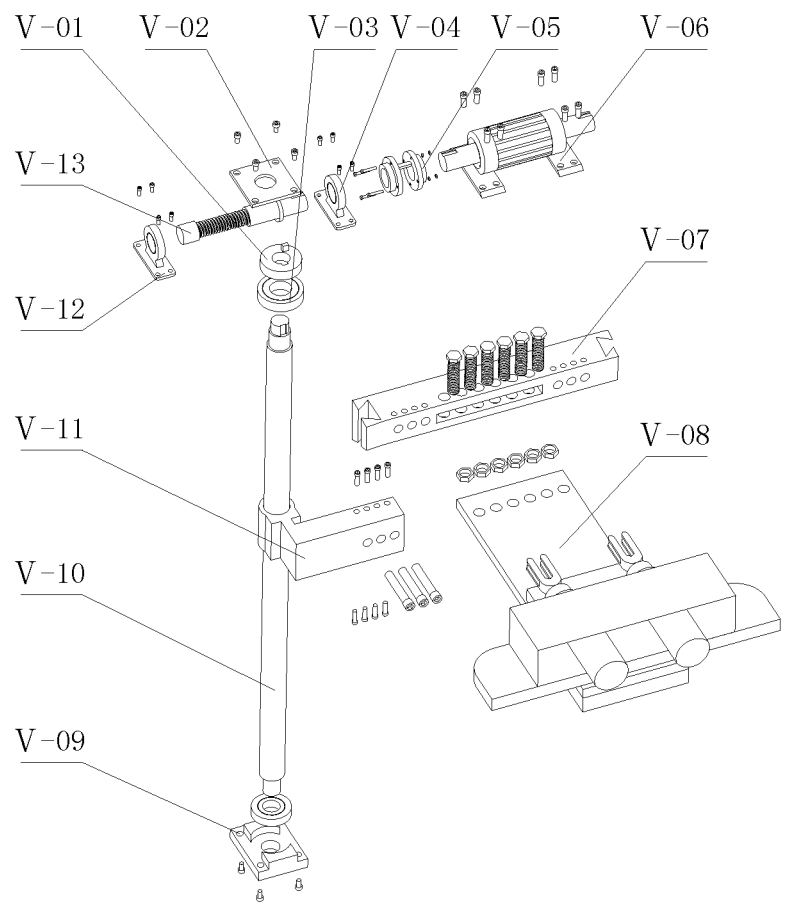
FIG. 22 is an exploded view of an assembly component of a cutter head loading and unloading conveyor lifting unit in Embodiment 1 and Embodiment 2 of the present disclosure.
Figure 23A:
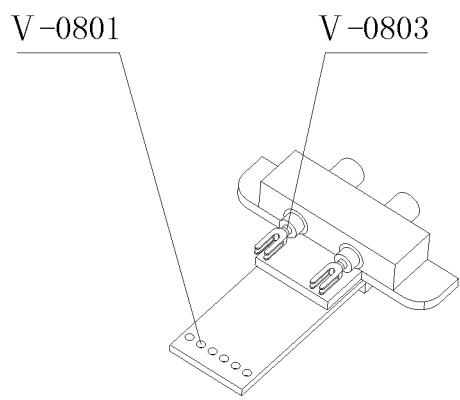
FIG. 23(a) is an axonometric diagram of a cutter head telescopic rotating gripper in Embodiment 1 and Embodiment 2 of the present disclosure.
Figure 23B:
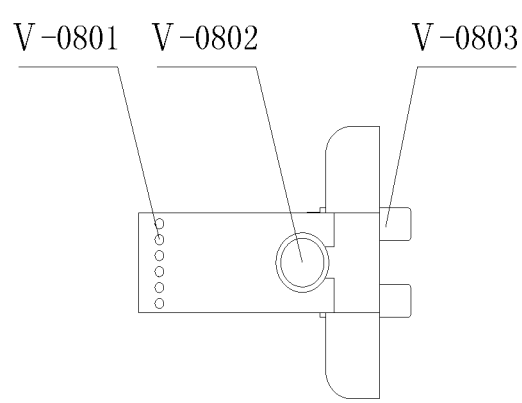
FIG. 23(b) is a bottom view of the cutter head telescopic rotating gripper in Embodiment 1 and Embodiment 2 of the present disclosure.

The movement of the cutter head grabber V-08 in the vertical direction is realized through a mechanical device. The exploded view of the assembly component is as shown in FIG. 22. A motor drives a worm rod to rotate, and a worm wheel is further driven to rotate. The worm wheel is in fixed circumferential connection with a lead screw. The lead screw rotates along with the worm wheel. Finally, a nut cooperating with the lead screw does linear movement in the axial direction of the lead screw, and thus the cutter head grabber fixedly connected to the nut realizes linear movement.

Figure 20:
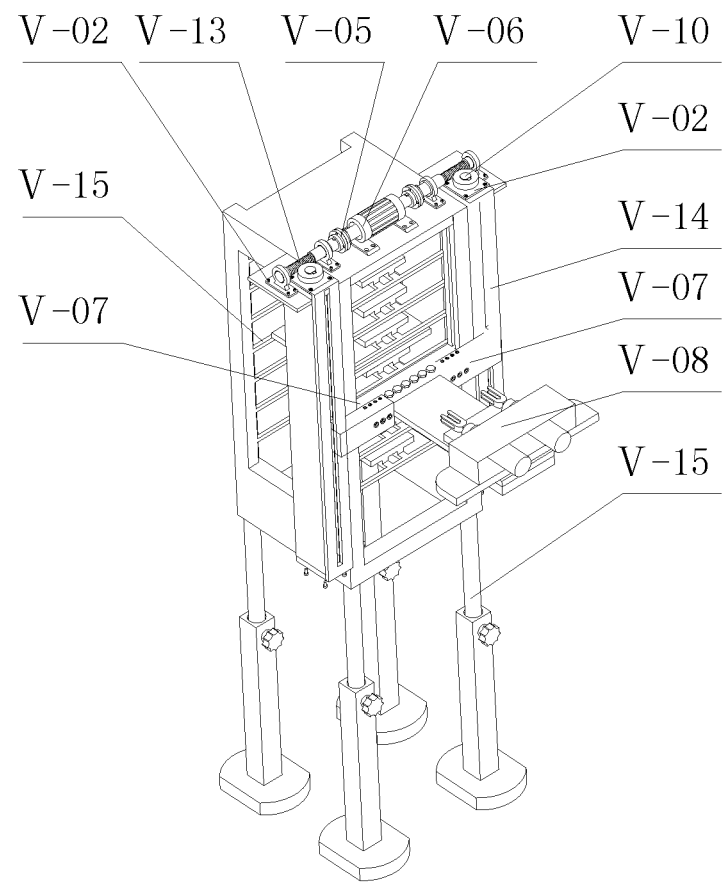
FIG. 20 is an axonometric diagram of a blade periphery grinding machine cutter head loading and unloading conveyor in Embodiment 1 and Embodiment 2 of the present disclosure.
Figure 21:
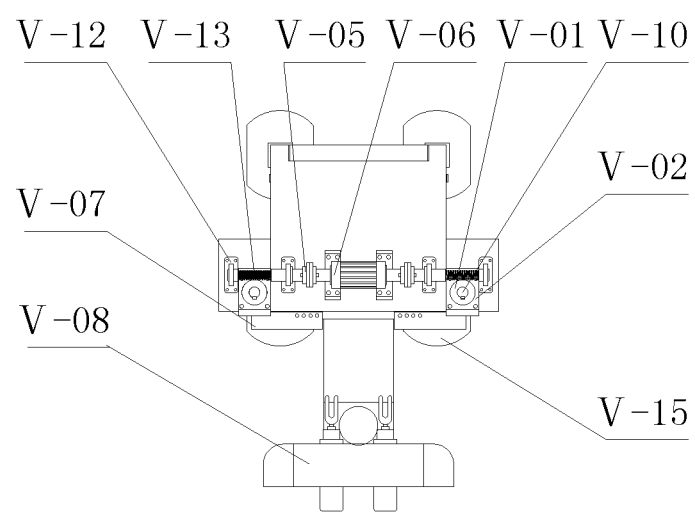
FIG. 21 is a top view of the blade periphery grinding machine cutter head loading and unloading conveyor in Embodiment 1 and Embodiment 2 of the present disclosure.

The axonometric diagram of the periphery grinding machine cutter head loading and unloading conveyor is as shown in FIG. 20, and the top view is as shown in FIG. 21. A lifting driving double-shaft motor V-06 is fixed to the top of a conveyor. The double-side output shaft rotating movement of the double-shaft motor is converted into the linear lifting movement of a nut block through transmission components such as a lifting driving worm rod V-13, a lifting driving worm wheel V-01, a lifting lead screw V-10 and a lead screw nut fixing block V-11. A used worm wheel and worm rod mechanism enables a transmission system to stably operate and to realize a reverse self-locking function, so that the safety of the lifting system is ensured.

Figure 24A:
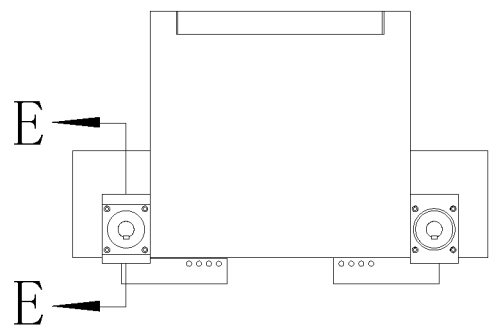
FIG. 24(a) is a top view of a cutter head loading and unloading conveyor lifting unit in Embodiment 1 and Embodiment 2 of the present disclosure.
Figure 24B:
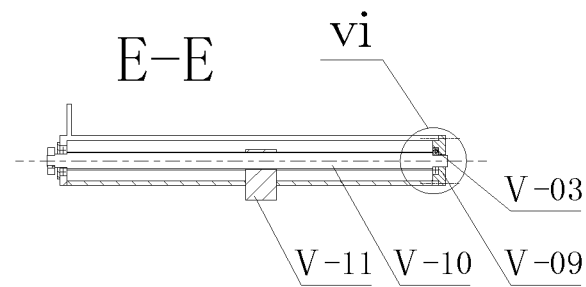
FIG. 24(b) is a local sectional view along E-E in FIG. 24(a).
Figure 24C:
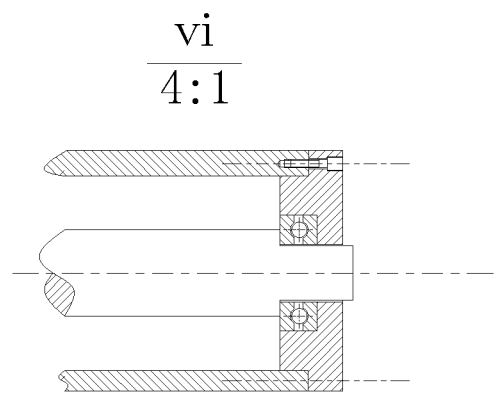
FIG. 24(c) is a local enlarged view of a position vi in FIG. 24(b).
Figure 25A:
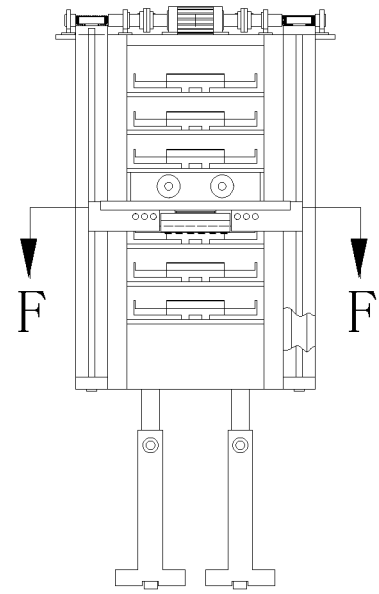
FIG. 25(a) is a front view of the blade periphery grinding machine cutter head loading and unloading conveyor in Embodiment 1 and Embodiment 2 of the present disclosure.
Figure 25B:
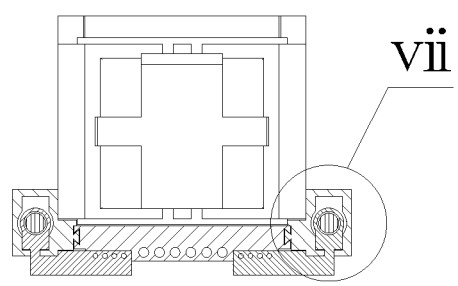
FIG. 25(b) is a sectional view along F-F in FIG. 25(a).
Figure 25C:
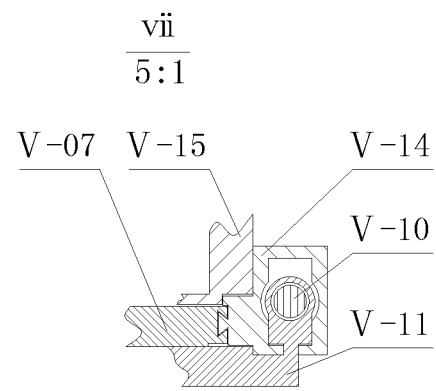
FIG. 25(c) is a local enlarged view of a position vii in FIG. 25(b).

The end portion of the lifting lead screw V-10 is provided with a lifting lead screw thrust bearing V-03 which cooperates with a closed cavity top plate V-02 and a closed cavity bottom plate V-09 for installation. The component assembly relationship is as shown in FIG. 24. The assembly relationship of a cutter head gripper fixing sliding block V-07 with a lead screw nut fixing block V-11 and a lead screw fixing frame V-14 is as shown in FIG. 25. In a process of driving the cutter head gripper fixing sliding block V-07 to ascend and descend by the lead screw nut fixing block V-11, a trapezoidal sliding rail of the lead screw fixing frame V-14 is used as a guide device.

The above system apparatus has the following specific work process: the periphery grinding machine cutter head loading and unloading conveyor V is in charge of loading the cutter head to the blade periphery grinding machine, and conveying the cutter head completing the blade grinding to the tail end station of the periphery grinding machine cutter head transfer stations VI.

In this work process, the periphery grinding machine cutter head loading and unloading conveyor V is in communication connection with each periphery grinding machine. After the grinding of a certain grinding machine is completed, a signal is sent to the periphery grinding machine cutter head loading and unloading conveyor V to unload the cutter head into the cutter head storage space and grab an unground blade therefrom for cutter head loading. There is always a certain quantity of loading cutter heads in the storage space, so as to ensure the fast loading after the unloading of the grinding machine cutter head, and improve the utilization rate of the grinding machine.

When two or more grinding machines send unloading instructions at the same time, the periphery grinding machine cutter head loading and unloading conveyor V sequentially performs loading and unloading according to the principle of proximity. After the loading and unloading is completed, the unloading cutter head is firstly conveyed to the tail end station of the cutter head transfer stations VI, and is then moved to the initial end station of the cutter head transfer stations VI for taking the loaded cutter heads.

In order to meet the moving requirement of the cutter head loading and unloading conveyor, an AGV device is used cooperatively, which can quickly move to a specific space position for corresponding conveying work of the cutter head according to the conveying requirements.

The cutter head loading and unloading conveyor is provided with the temporary storage space, and automatic judgment and dynamic conveying of the cutter heads in the storage space are performed according to the production line requirements.

The cutter head loading and unloading robot IV is in charge of conveying the unloading cutter heads among the blade water pressure cleaning device I, the blade ultrasonic cleaning device II and the blade air drying device III. The time of the blade cleaning and air drying work process is shorter, so that a sequential processing mode of high-pressure water jet cleaning, ultrasonic cleaning and air drying is used. Before the cutter head loading and unloading robot loads the cutter head to specified an apparatus, a processing preparation instruction is sent, and the apparatus receives the instruction and then enters a processing preparation mode. After the cutter head is clamped in a work region, the processing is started. After the processing is completed, a processing completion instruction is sent to the robot to take the cutter head and convey the cutter head to a next work procedure link.

Figure 27:
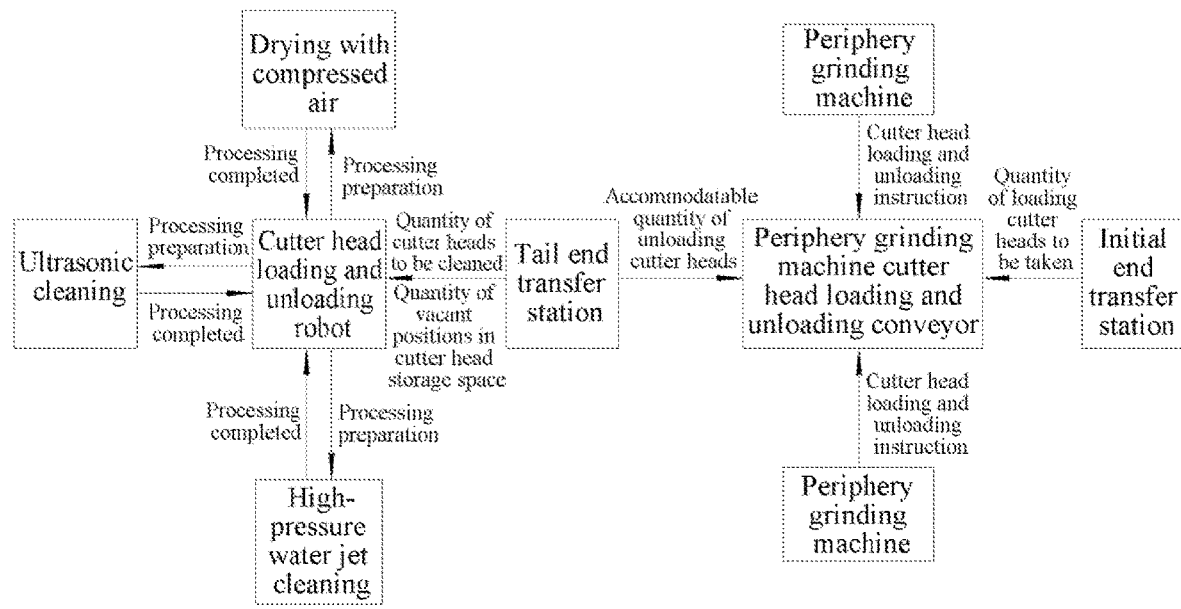
FIG. 27 is an apparatus state information sharing relationship diagram in Embodiment 1 and Embodiment 2 of the present disclosure.

After the blade cleaning and air drying are completed, the cutter head is conveyed to the tail end station for temporary storage, waiting for the taking by the loading apparatus in the blade subsequent processing link. Each function apparatus of the system is provided with a state monitoring module, state information is shared between different apparatuses, as shown in FIG. 27. The general control system dynamically adjusts the work sequence according to the apparatus state feedback information, the anti-interference capability of the loading and unloading system is improved, and the connection stability of the cutter head loading, unloading and conveyance, and blade cleaning and air drying link flow processes is improved.

Intelligent control modules are disposed in the system, different modules are communicated with each other using matched communication protocols, and all sub units are coordinated and commanded to complete the work under the general control system. At the same time, the system can be directly connected into a digital production workshop system, meeting the modern intelligent manufacturing requirements.

The foregoing descriptions are merely preferable embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

What is claimed is:

1. A carbide blade cleaning device comprising:
    a water pressure cleaning device;
    an ultrasonic cleaning device; and
    an air drying device,
    wherein the water pressure cleaning device comprises a cleaning chamber for accommodating a cutter head and a water jet mechanism with an output end facing the cutter head,
    the ultrasonic cleaning device comprises a cleaning box and a cutter head fixing box provided with an opening in a side surface for accommodating the cutter head, and a first telescopic mechanism drives the cutter head fixing box to adjust a relative position to the cleaning box,
    the air drying device comprises a cutter head fixing table and an air drying mechanism with an output end facing the cutter head fixing table,
    the cutter head fixing box is disposed on the cleaning box through an ultrasonic cleaning support frame, the cutter head fixing box is connected to the ultrasonic cleaning support frame through a telescopic air cylinder, and the cutter head fixing box is driven under the action of the telescopic air cylinder to enter or retreat from a work groove of the cleaning box, and
    an opening is formed in each of a pair of side surfaces of the cutter head fixing box, side surfaces adjacent to the side surfaces with the openings are connected to the telescopic air cylinder, and a plurality of cleaning holes communicating with the inside of the cutter head fixing box are formed in each of a top plate and a bottom plate of the cutter head fixing box.

2. The carbide blade cleaning device according to claim 1, wherein the water jet mechanism communicates with a water circulation mechanism through a pipeline, an input end of the water circulation mechanism communicates with a cleaning water collecting box positioned at the bottom of the cleaning chamber, and an output end communicates with a plurality of spray nozzles of the water jet mechanism through an electromagnetic valve.

3. The carbide blade cleaning device according to claim 2, wherein a baffle cooperates with a side surface of the cleaning chamber,
    the baffle cooperates with the water jet mechanism at the top of the cleaning chamber and the cleaning water collecting box at the bottom of the cleaning chamber to form a cleaning space, and
    the baffle cooperates with a lifting mechanism, and the lifting mechanism drives the baffle to ascend or descend so as to close or open the cleaning space.

4. The carbide blade cleaning device according to claim 1, wherein the air drying mechanism comprises an air source for hot air output and an air drier capable of adjusting a relative position to the cutter head fixing table, the air drier communicates with the air source, and an output end of the air drier is provided with a ventilation chamber corresponding to a blade cutter head storage station for correspondingly air-drying a workpiece positioned on a blade cutter head.

5. The carbide blade cleaning device according to claim 4, wherein the cutter head fixing table cooperates with a lead screw sliding block mechanism, the lead screw sliding block mechanism cooperates with a positioning sliding block, and the positioning sliding block cooperates with the cutter head fixing table to form a cutter head clamp for pushing the cutter head from two sides for positioning and clamping.

6. A carbide blade cleaning system comprising:
- a transfer station for storing a cutter head;
- a conveyor cooperating with the transfer station;
- a loading and unloading robot cooperating with the transfer station; and
- the carbide blade cleaning device according to claim 1,
   wherein the conveyor comprises a support seat, a storage box disposed on the support seat and a grabber disposed on the storage box, the grabber is disposed on the storage box through a position adjusting mechanism, and the position adjusting mechanism drives the grabber to adjust a relative position to the storage box for grabbing the cutter head and putting into the storage box or taking out the cutter head from the storage box, and
- the conveyor cooperates with a conveying mechanism through the support seat for driving the conveyor to adjust position; and a plurality of transfer stations cooperate on a conveyor moving path, and a plurality of storage lattices are disposed in the transfer station for storing the cutter heads.

* * * * *